US012630452B2

(12) United States Patent
Perera et al.

(10) Patent No.: US 12,630,452 B2
(45) Date of Patent: May 19, 2026

(54) ELECTROHYDROMODULATING PROCESS FOR RECOVERING NUTRIENTS, MINERALIZING ORGANICS, AND INACTIVATING PATHOGENS IN WASTEWATER

(71) Applicant: UNIVERSITY OF MIAMI, Miami, FL (US)

(72) Inventors: Mahamalage Kusumitha Perera, Miami, FL (US); James Englehardt, Miami, FL (US)

(73) Assignee: UNIVERSITY OF MIAMI, Miami, FL (US)

( * ) Notice: Subject to any disclaimer, the term of this patent is extended or adjusted under 35 U.S.C. 154(b) by 1218 days.

(21) Appl. No.: 17/612,366

(22) PCT Filed: Jun. 17, 2020

(86) PCT No.: PCT/US2020/038134
§ 371 (c)(1),
(2) Date: Nov. 18, 2021

(87) PCT Pub. No.: WO2020/257282
PCT Pub. Date: Dec. 24, 2020

(65) Prior Publication Data
US 2022/0227649 A1    Jul. 21, 2022

Related U.S. Application Data

(60) Provisional application No. 62/862,530, filed on Jun. 17, 2019.

(51) Int. Cl.
*C02F 9/00*        (2023.01)
*B01D 61/46*       (2006.01)
(Continued)

(52) U.S. Cl.
CPC .............. *C02F 9/00* (2013.01); *B01D 61/464* (2022.08); *C05F 7/00* (2013.01); *B01D 2311/18* (2013.01);
(Continued)

(58) Field of Classification Search
CPC .... C02F 9/00; C02F 1/004; C02F 1/20; C02F 1/46104; C02F 1/4693; C02F 1/52;
(Continued)

(56) References Cited

U.S. PATENT DOCUMENTS

2013/0087501 A1    4/2013  Moe et al.
2017/0210644 A1    7/2017  Schaffer et al.
(Continued)

OTHER PUBLICATIONS

"Experimental Study on Four Cation Exchange Membranes in Electrosynthesis of Ammonium Persulfate" by Wang et al., J. Electrochem. Sci. Technol., 9(1), pp. 37-43 (2018).*
(Continued)

*Primary Examiner* — Bryan D. Ripa
(74) *Attorney, Agent, or Firm* — Procopio, Cory, Hargreaves & Savitch LLP

(57) ABSTRACT

A system for electrohydromodulation of wastewater. In an embodiment, the system comprises an anode in contact with at least one anodic chamber and a cathode in contact with a cathodic chamber. Each anodic chamber and the cathodic chamber are configured to receive a flow of wastewater. A first multivalent cation exchange membrane, between each anodic chamber and the cathodic chamber, allows multivalent cations to pass therethrough while preventing monovalent ions to pass therethrough. A power source is electrically coupled to each anode and the cathode, and is configured to apply a voltage across wastewater in the anodic chamber and
(Continued)

the cathodic chamber, to thereby cause multivalent cations in the wastewater to pass through the multivalent cation exchange membrane.

21 Claims, 10 Drawing Sheets

(51) Int. Cl.

| | |
|---|---|
| *C02F 1/00* | (2023.01) |
| *C02F 1/20* | (2023.01) |
| *C02F 1/461* | (2023.01) |
| *C02F 1/469* | (2023.01) |
| *C02F 1/52* | (2023.01) |
| *C02F 101/10* | (2006.01) |
| *C02F 101/16* | (2006.01) |
| *C02F 103/00* | (2006.01) |
| *C05F 7/00* | (2006.01) |

(52) U.S. Cl.
    CPC ................. *B01D 2311/2642* (2013.01); *B01D 2311/2661* (2013.01); *B01D 2311/2684* (2013.01); *C02F 1/004* (2013.01); *C02F 1/20* (2013.01); *C02F 1/46104* (2013.01); *C02F 1/4693* (2013.01); *C02F 1/52* (2013.01); *C02F 2101/105* (2013.01); *C02F 2101/16* (2013.01); *C02F 2103/005* (2013.01); *C02F 2201/4613* (2013.01); *C02F 2201/46185* (2013.01); *C02F 2301/046* (2013.01); *C02F 2301/08* (2013.01)

(58) Field of Classification Search
    CPC ............ C02F 2101/105; C02F 2101/16; C02F 2103/005; C02F 2201/4613; C02F 2201/46185; C02F 2301/046; C02F 2301/08; B01D 61/464; B01D 2311/18; B01D 2311/2642; B01D 2311/2661; B01D 2311/2684; C05F 7/00; C25B 9/13; C25B 9/19; C25B 9/75; C25B 11/043; C25B 13/08; C25B 15/083; C25B 1/01
    See application file for complete search history.

(56) References Cited

U.S. PATENT DOCUMENTS

| 2019/0225517 A1* | 7/2019 | Tabanpour | .............. C01B 25/32 |
| 2022/0112103 A1* | 4/2022 | Trotochaud | .......... B01D 61/463 |

OTHER PUBLICATIONS

International Search Report and Written Opinion for corresponding PCT/US2020/038134, mailed on Oct. 29, 2020, in 9 pages.

Kappel et al. "Electrochemical phosphate recovery from nanofiltration concentrates." Separation and Purification Technology 120 (Dec. 13, 2013):437-444.

Rubinstein. "Effect of concentration polarization upon the valency-induced counterion selectivity of ion-exchange membranes." Journal of the Chemical Society, Faraday Transactions 2: Molecular and Chemical Physics 80.3 (Aug. 18, 1984): 335-344.

Forrestal et al. "Sustainable desalination using a microbial capacitive desalination cell." Energy & Environmental Science 5.5 (Mar. 13, 2012): 7161-7167.

Perera et al. "Electrohydromodulation for Phosphate Recovery from Wastewater." Separation and Purification Technology (Apr. 23, 2020): 116909.

* cited by examiner

ELECTROHYDROMODULATING PROCESS FOR RECOVERING NUTRIENTS, MINERALIZING ORGANICS, AND INACTIVATING PATHOGENS IN WASTEWATER

CROSS-REFERENCE TO RELATED APPLICATIONS

This application claims priority to U.S. Provisional Patent App. No. 62/862,530, filed on Jun. 17, 2019, which is hereby incorporated herein by reference as if set forth in full.

BACKGROUND

Field of the Invention

The embodiments described herein are generally directed to wastewater treatment, and, more particularly, to the recovery or separation of phosphate and/or nitrogen from a volume of wastewater through electrolysis of the wastewater across a multivalent cation exchange membrane.

Description of the Related Art

Food production and agriculture are highly dependent on the use of phosphate fertilizer. As a result, worldwide, phosphorus (P) strip mines produce over 280 megatons of radioactive phosphogypsum waste, annually. Thus, phosphate recovery could provide a significant environmental benefit.

Nitrogen (N) and phosphorus are macro nutrients that are widely used in agriculture. However, the conversion of atmospheric $N_2$ to ammonia fertilizer is energy intensive, and phosphorus is a non-renewable resource. Furthermore, production of phosphate fertilizer has generated large volumes of weakly radioactive phosphogypsum waste, requiring long-term storage, whereas approximately 15% of the demand for nitrogen and phosphorus fertilizers can be satisfied by recovering nutrients from wastewater. While phosphorus is often the limiting nutrient in eutrophication in fresh water, inorganic nitrogen is a co-limiting nutrient in oceans, representing an important cause of algal blooms. In fact, the global annual social costs of nitrogen and phosphorus pollution have been reported as 200-2,000 billion USD (0.3-3% of global gross domestic product (GDP)) and 250-450 billion USD (0.4-0.7% of GDP), respectively.

While a number of phosphate-recovery technologies are available, only some have been recognized as cost-effective. For example, struvite precipitation can be efficient at high phosphate concentrations, but may not be economical at low phosphate concentrations. In addition, the energy consumption of such technologies can be prohibitive, inasmuch as increases in energy consumption increase operating costs and carbon emissions of these technologies. Thus, a need remains for cost-effective and eco-friendly phosphate-recovery technologies.

Ideally, a nutrient recovery process would recover nitrogen and phosphorus in fertilizer form. For nitrogen, gas-permeable membranes and electrodialysis can produce concentrated ammonia solutions of $(NH_4)_2SO_4$ and $NH_4NO_3$ that can be converted to solid fertilizer. However, gas-permeable membranes are best suited for recovering ammonia at high concentrations, and the number of modules and capital costs would substantially increase below 50 mg/L. In contrast, ammonia can be removed by liquid-gas stripping, even at low concentrations (13.3-16.2 mg/L). However, the high cost of chemicals for pH shifting, to release free ammonia, hinders economic feasibility. Furthermore, the disposal of high pH effluent after ammonia liquid-gas stripping is problematic.

Electrochemical phosphate-recovery processes have shown promise. See, e.g., "Phosphate Recovery from Human Waste via the Formation of Hydroxyapatite during Electrochemical Wastewater Treatment," Cid et al., doi: 10.1021/acssuschemeng.7b03155, 2018; "Electrochemical Removal of Phosphate Ions from Treated Wastewater," Gorni-Pinkesfeld et al., Ind. Eng. Chem. Res. 52, 13795-800, doi:10.1021/ie401930c, 2013; and "Electrochemical phosphate recovery from nanofiltration concentrates," Kappel et al., Sep. Purif. Technol. 120, 437-44, doi:10.1016/j.seppur.2013.10.022, 2013; which are all hereby incorporated herein by reference as if set forth in full. Electrochemical processes typically employ sacrificial anodes to dose cations, such as $Mg^{2+}$, $Al^{3+}$, $Fe^{2+}$, or $Fe^{3+}$, to support chemical precipitation. See, e.g., "Electrochemical technologies in wastewater treatment," Chen, Sep. Purif. Technol. 38, 11-41, doi:10.1016/j.seppur.2003.10.006, 2004; "Comparison investigation on phosphate recovery from sludge anaerobic supernatant using the electrocoagulation process and chemical precipitation," Huang et al., J. Clean. Prod. 141, 429-38, doi:10.1016/j.jclepro.2016.09.127, 2017; and "Struvite precipitation and phosphorus removal using magnesium sacrificial anode," Kruk et al., Chemosphere 101, 28-33, doi:10.1016/j.chemosphere.2013.12.036, 2014; which are all hereby incorporated herein by reference as if set forth in full. Among these approaches, electrochemical $Mg^{2+}$ dosing has become popular for inducing struvite precipitation, as a more cost-effective alternative to $Mg^{2+}$ supplementation using $MgSO_4$, MgO, $Mg(OH)_2$, or $MgCl_2$. See, e.g., "Struvite precipitation from urine with electrochemical magnesium dosage," Hug et al., Water Res. 47, 289-99, doi:10.1016/j.watres.2012.09.036, 2012, which is hereby incorporated herein by reference as if set forth in full. However, this process is only effective on concentrated phosphate streams, such as urine and anaerobic sludge digester supernatant, because low phosphate streams require a pH higher than 9. See, e.g., Hug; "Effect of Pilot Plant Configuration on the Electrochemical Precipitation for Phosphorus recovery with the ePhos Technology," Mariakakis et al., in WEF Nutrient Symposium 2017, Ft. Lauderdale, pp. 537-40, 2017; "Preliminary investigation into factors affecting controlled struvite crystallization at the bench scale," Adnan et al., J. Environ. Eng. Sci. 3, 195-202, doi:10.1139/s03-082, 2004; and "Pilot-scale study of phosphorus recovery through struvite crystallization—examining the process feasibility," Adnan et al., J. Environ. Eng. Sci. 2, 315-24, doi:10.1139/s03-04, 2003; which are all hereby incorporated herein by reference as if set forth in full. Hug et al. indicated that the process is economical compared with the addition of rapidly-dissolving chemicals, such as $MgCl_2$ or $MgSO_4$, but more expensive than adding slowly dissolving MgO.

As an alternative to sacrificial anodes, dimensionally stable anodes (DSAs), coupled with recently developed cation exchange membranes, have been used for adjusting pH to support precipitation. See, e.g., Cid et al.; Gorni-Pinkesfeld et al; Kappel et al.; and "Calcium carbonate hardness removal by a novel electrochemical seeds system," Hasson et al., Desalination 263, 285-9, doi:10.1016/j.desal.2010.06.036, 2010, which is hereby incorporated herein by reference as if set forth in full. Because aqueous pH exerts a dominant influence on reactions in water, such an in situ process can avoid the cost of chemical addition (see, e.g., "Potential phosphorus recovery by struvite formation," Jaffer et al., Water Res. 36, 1834-42, doi:10.1016/50043-1354(01)00391-8, 2002, which is hereby incorporated herein by reference as if set forth in full), as well as the expenditure of energy required for their production, in many applications. In other words, the pH of water can be shifted electrochemically, through electrolysis:

$$\text{Anode: } H_2O \rightarrow 4H^+ + O_2 + 4e^- \tag{1}$$

$$\text{Cathode: } H_2O + 4e^- \rightarrow 4OH^- + 2H_2 \tag{2}$$

In particular, to induce phosphate precipitation, Kappel et al. demonstrated phosphate recovery of over 90% from nanofiltration concentrate, derived from a membrane bioreactor (MBR), by shifting the pH above 9 using enhanced phosphate recovery (EPR). Such electrochemical processes are even more efficient in treating more highly mineralized waters, such as the influent to a net-zero water (NZW) process (e.g., nearly closed-loop direct potable water reuse). See, e.g., "Mineralizing urban net-zero water treatment: Phase II field results and design recommendations," Gassie et al., Water Res. 105, 496-506, doi:10.1016/j.watres.2016.09.005, 2016, which is hereby incorporated herein by reference as if set forth in full. However, the aerobically treated and nanofiltered domestic wastewater inflow to the process in Kappel et al. contained only 1.63 mg/L $PO_4^3$ as the phosphate, whereas medium-strength domestic wastewater contains approximately 2.4 mg/L total phosphate prior to treatment. See, e.g., "Wastewater Engineering: Treatment and Resource Recovery," Tchobanoglous et al., 5th ed., McGraw Hill, 2014, which is hereby incorporated herein by reference as if set forth in full. More recently, Cid et al. demonstrated phosphate recovery from toilet wastewater, which is much more concentrated (e.g., 18.6 mg-P/L) than typical domestic wastewater. However, that process had a high energy demand. In addition, the authors indicated that precipitate formation on the cathode surface may be problematic in long-term operation.

SUMMARY

Accordingly, embodiments of electrohydromodulation (EHM) are disclosed that utilize electrochemical pH shifting to perform efficient recovery of phosphate and/or nitrogen, directly from settled sewage, and hence prior to microbiological assimilation into biomass.

In an embodiment, a system for electrohydromodulation of wastewater comprises: a first anodic chamber configured to receive a flow of wastewater; a first anode in contact with the first anodic chamber; a cathodic chamber configured to receive the flow of wastewater; a cathode in contact with the cathodic chamber; a first multivalent cation exchange membrane between the first anodic chamber and the cathodic chamber, wherein the multivalent cation exchange membrane allows multivalent cations to pass therethrough while preventing monovalent ions to pass therethrough; and a power source electrically coupled to the first anode and the cathode, wherein the power source is configured to apply a voltage across wastewater in the first anodic chamber and the cathodic chamber, to thereby cause multivalent cations in the wastewater to pass through the multivalent cation exchange membrane. The system may further comprise a carbon dioxide stripping column connected to the first anodic chamber, so as to receive wastewater from the first anodic chamber and return wastewater to either the first anodic chamber or the cathodic chamber, wherein the carbon dioxide stripping column strips carbon dioxide from the wastewater passing therethrough.

The cathodic chamber may be configured to receive the flow of wastewater after the first anodic chamber, and the system may further comprise: a second anodic chamber configured to receive the flow of wastewater after the cathodic chamber; a second anode in contact with the second anodic chamber; and a second multivalent cation exchange membrane between the second anodic chamber and the cathodic chamber. The first and second multivalent cation exchange membranes may be a single cation exchange membrane. Alternatively, the first and second multivalent cation exchange membranes may be separate and distinct from each other.

The system may further comprise a filter connected to the cathodic chamber, so as to receive the flow of wastewater from the cathodic chamber, wherein the filter extracts phosphate precipitates from the wastewater as it flows from the cathodic chamber to the second anodic chamber. The system may further comprise a phosphate fertilizer collection tank, wherein the filter provides the extracted phosphate precipitates to the phosphate fertilizer collection tank. The second anodic chamber may further comprise an effluent flow path configured to dispense the filtered wastewater out of the second anodic chamber. The first anodic chamber may be configured to receive wastewater from a septic tank, and the second anodic chamber may be configured to dispense the filtered wastewater to a leach field.

The system may further comprise an ammonia stripping column connected between the filter and the second anodic chamber, so as to receive the filtered wastewater from the filter before the filtered wastewater flows to the second anodic chamber, wherein the ammonia stripping column strips ammonia gas from the wastewater passing therethrough. The ammonia stripping column may comprise a plurality of Raschig rings. The system may further comprise: an absorption column; and a gas line; wherein the gas line circulates a gas through the ammonia stripping column to extract the ammonia gas from the wastewater passing through the ammonia stripping column, and provides the extracted ammonia gas to the absorption column. The system may further comprise a sulfuric acid tank configured to supply sulfuric acid through the absorption column to produce ammonium sulfate. The sulfuric acid may be a sulfuric acid dilution with 5.8 molarity.

The system may further comprise an influent flow equalization tank, positioned between a wastewater source and the first anodic chamber, wherein the influent flow equalization tank is configured to equalize a flow rate of the flow of wastewater through the first anodic chamber and the cathodic chamber. Each of the first anode and the cathode may comprise an isomolded graphite electrode. The first multivalent cation exchange membrane may comprise gel polystyrene cross-linked with divinylbenzene having sulfonic acid functional groups. The first multivalent cation exchange membrane may be reinforced by polyethylene terephthalate (PET). The applied voltage may be between 5 volts and 7 volts.

The system may comprise a plurality of cells stacked between two securement plates, wherein each of the plurality of cells comprises: the first anode; the cathode; the first multivalent cation exchange membrane; a first gasket sandwiched between the first anode and the first multivalent cation exchange membrane on a first side of the first multivalent cation exchange membrane, wherein the first gasket defines a first flow path and a second flow path, wherein the first flow path defines the first anodic chamber and wherein the second flow path defines a second anodic chamber that is separate from the first anodic chamber, wherein the first anode is in contact with both the first anodic chamber and the second anodic chamber, wherein the first flow path comprises a first inlet and a first outlet, and wherein the second flow path comprises a second inlet and a second outlet; and a second gasket sandwiched between the cathode and the first multivalent cation exchange membrane on a second side of the first multivalent cation exchange membrane that is opposite the first side, wherein the second gasket defines a third flow path, wherein the third flow path defines the cathodic chamber, and wherein the third flow path comprises a third inlet and a third outlet. The orientations of the plurality of cells may alternate along a longitudinal axis between the two securement plates, such that each cell either: shares its first anode with an adjacent cell; shares its cathode with an adjacent cell; or shares its first anode with an adjacent cell on a first side and shares its cathode with another adjacent cell on a second side that is opposite the first side.

In an embodiment, a method for electrohydromodulation of wastewater comprises: providing a continuous flow of wastewater through a reactor that comprises a first anodic chamber, a second anodic chamber, a cathodic chamber, and a multivalent cation exchange member between the first anodic chamber and the cathodic chamber and between the second anodic chamber and the cathodic chamber, wherein at least one anode is in contact with the first and second anodic chambers, wherein a cathode is in contact with the cathodic chamber, wherein the multivalent cation exchange membrane is configured to allow multivalent cations to pass therethrough while preventing monovalent ions to pass therethrough, and wherein the continuous flow comprises a path from an exterior of the first anodic chamber to the first anodic chamber to the cathodic chamber to the second anodic chamber to an exterior of the second anodic chamber; stripping carbon dioxide from the wastewater in the first anodic chamber; after stripping the carbon dioxide from the wastewater in the first anodic chamber, applying a voltage between the first anode and the cathode and between the second anode and the cathode to decrease pH of wastewater in the first anodic chamber and the second anodic chamber and increase pH of wastewater in the cathodic chamber, to thereby cause precipitation of phosphates in the cathodic chamber; extracting the precipitated phosphates from the wastewater in the cathodic chamber; and extracting ammonia gas from the wastewater in the path between the cathodic chamber and the second anodic chamber. The method may further comprise periodically reversing a polarity between the first anode and the cathode and between the second anode and the cathode.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 6A-6D are micrographs of precipitates obtained using the EHM process with different voltages, according to an embodiment;

DETAILED DESCRIPTION

Figure 1:
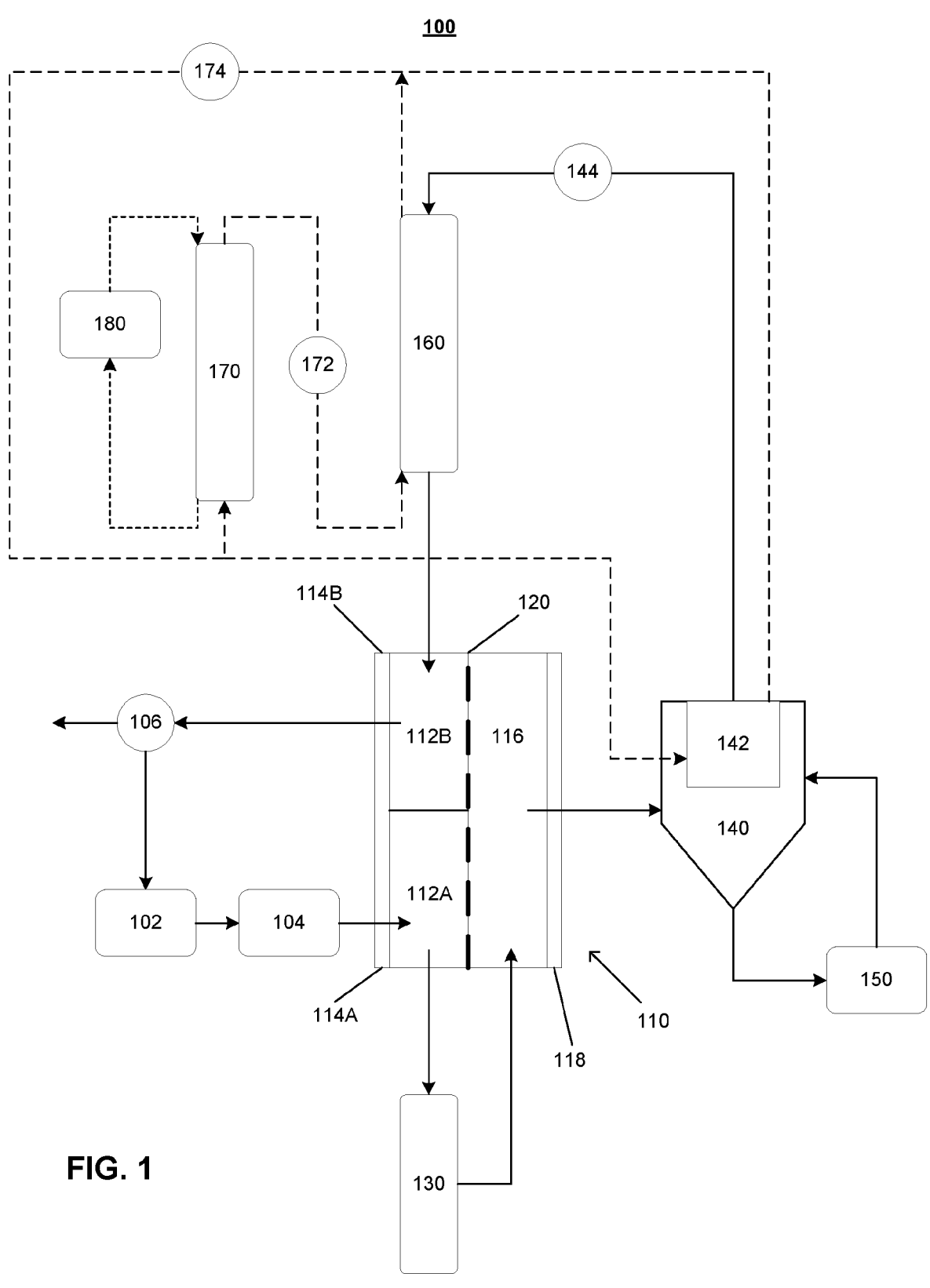
FIG. 1 illustrates the EHM process, according to an embodiment.

Embodiments of an EHM process are disclosed. The results of bench-scale experiments, using the disclosed EHM process to recover phosphate from simulated and actual filtered septic tank effluent, with and without mineral spiking (e.g., to simulate the influent of a NZW process), demonstrated efficient phosphate recovery. In an embodiment, the EHM process employs a multivalent cation-exchange membrane (e.g., CMI-7000) to allow shifting of pH across a small electrode gap, while minimizing neutralization due to proton exchange. Recovered phosphate precipitates were analyzed and characterized using scanning electrode microscopy (SEM), energy-dispersed spectra (EDS), and X-ray diffraction (XRD) techniques. The optimum voltage for the EHM reactor voltage was determined based on the phosphate recovery efficiency and corresponding energy usage, to provide the groundwork for a continuous-flow nutrient recovery system.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Process Overview

In an embodiment, the EHM process comprises the application of a voltage across electrochemical cells or chambers that contain wastewater and are separated by a multivalent cation exchange membrane. A multivalent cation exchange membrane is a type of CEM that has only recently become available. It passes primarily multivalent cations, to the relative exclusion of monovalent ions (e.g., hydrogen ions). Unlike conventional CEMs, such as those used in Kappel et al., multivalent cation exchange membranes effectively exclude hydrogen ion passage. This permits more efficient shifting of a bulk solution's pH over a broad range, more efficient carbon dioxide stripping to decrease competition between calcium carbonate precipitation and calcium phosphate precipitation (thereby increasing process efficiency and fertilizer purity), and a decrease in fouling of electrode surfaces.

One of the electrochemical chambers is configured with an anode, while another of the electrochemical chambers is configured with a cathode. When a current is applied between the anode and the cathode, the anodic chamber becomes acidic and the cathodic chamber becomes basic. This is due to the hydrolysis of water, which produces oxygen at the anode and hydrogen gas at the cathode, and the passage of multivalent cations through the multivalent cation exchange membrane from the anodic chamber to the cathodic chamber.

Several characteristics of settled raw sewage make it particularly amenable to the EHM process. These characteristics include moderate bicarbonate alkalinity, which provides necessary buffering in the anodic chamber, while allowing carbon dioxide stripping to prevent hydrogen ions from migrating from the cathodic chamber. It also prevents calcium carbonate from competing with calcium phosphate precipitation at the cathode. In addition, wastewater lacks high concentrations of other minerals, such as magnesium, that might interfere with the EHM process.

In typical wastewater, which is derived from natural water, the dominant multivalent cation that passes through the multivalent cation exchange membrane, during the EHM process, is calcium. Consequently, calcium phosphate or other phosphate salt fertilizer is precipitated at the cathode at the high pH that is achieved by the process (e.g., typically pH 11+).

In addition, at this high pH, ammonia that is present in municipal wastewater and other wastewaters is present as ammonia gas, rather than as highly soluble ammonia ions that would be present at a neutral pH. Therefore, in an embodiment, the ammonia gas is stripped by bubbling a gas, such as air, through the solution. In a preferred embodiment, a closed cycle is used, in order to minimize the introduction of oxygen and the potential oxidation of nitrogen (N) to soluble nitrate. The resulting ammonia-enriched gas (i.e., containing the stripped ammonia gas) may then be passed through a sulfuric acid solution to produce ammonium sulfate fertilizer.

During the disclosed EHM process, the simultaneous recovery of nitrogen and phosphorus fertilizer from wastewater may be accompanied by the mineralization of organics in the wastewater to carbon dioxide. This is demonstrated by experimental data that showed a reduction of total organic carbon (TOC) of approximately 60% on average, the majority of which appeared in preliminary tests due to mineralization, and the rest of which appeared due to physical separation by filtration. The experimental data also showed 96% inactivation of *E. coli*. Below is list of some experimental data that were observed for embodiments of the EHM process. Notably, the mineral-spiked sewage mentioned in the data simulates NZW sewage, which further increases efficiency, since NZW sewage is higher in minerals and therefore more conductive. In the embodiment for which this data was collected, a flow-through reactor was designed and used to simultaneously shift pH, precipitate phosphorus, and strip and absorb ammonia from spiked effluent.

Nitrogen and phosphorus were recovered directly from septic tank effluent and mineral-spiked septic tank effluent by the electrochemical pH shifting of the EHM process, without the addition of chemicals.

94-95% of the phosphate ($PO_4$) was recovered from mineral-spiked effluent and unspiked effluent, at an energy demand of 1.046 kWh/m$^3$ (3.960 kWh/1000 gallons) and 1.863 kWh/m$^3$ (7.045 kWh/1000 gallons), respectively.

On average, 89% of total nitrogen (TN) and 97% of total phosphorus (TP) was recovered in the continuous-flow system, resulting in averages of 0.09 mg/L TP and 4.75 mg/L TN in the effluent.

Electrochemical energy demand was 0.623 kWh/m$^3$ for pH shifting, while total energy demand (including EHM, filtration, stripping, and absorption) for a central treatment plant was calculated as 1.21 kWh/m$^3$ and approximately $12.98 per month for a single family home.

Recovered precipitates principally comprised amorphous calcium phosphate (ACP) with an overall calcium-to-phosphorus (Ca/P) ratio of 3.7.

Non-toxic graphite electrodes were devoid of fouling, following two years of experimentation when employing periodic polarity reversal.

These data demonstrate that embodiments of the EHM process can increase efficiency and decrease the potential for electrode fouling and corrosion (e.g., in saltwater applications). To protect more valuable electrode materials and/or to further increase electrical efficiency—particularly in some applications, such as saltwater applications—the reactor (also referred to herein as an "electrolyzer") in the EHM process can utilize bipolar membranes. In this case, the selective use of auxiliary electrolytes can reduce electrode overpotential and anode corrosion. For example, an acid solution can be used as the catholyte, and a base can be used as the anolyte.

The EHM process can be used to treat and reuse municipal wastewater, aquacultural wastewater, and/or other wastewater. As one example, the EHM process can be implemented as an add-on to a septic tank that purifies effluent prior to discharge to a leach field. In an embodiment, the EHM process simultaneously recovers nitrogen and phosphorus from settled sewage in an electrochemical continuous-flow pilot reactor. While no chemical dosing is required, a sulfuric acid solution (e.g., 5.8 M) can be periodically recharged. For example, the sulfuric acid solution may be recharged annually or biannually for recovery of ammonium sulfate fertilizer. In a particular implementation, the EHM process, on average:

Produces recovery of 89% of total nitrogen and 97% of total phosphorus with an electrochemical energy demand of 0.623 kWh/m$^3$.

Produces mineralization and/or removal of approximately 60% of total organics to carbon dioxide, with 95% of indicator bacteria inactivated.

Requires total energy, including energy for electrochemical pH modulation, filtration, and ammonia stripping and absorption, of 1.21 kWh/m$^3$ or less.

Produces precipitates having an amorphous morphology and an average Ca/P ratio of 3.7 (e.g., as indicated by XRD and EDS analysis), with slight variations (e.g., ±0.03) depending on the flow rate and resulting pH at the anode at a fixed voltage.

Does not foul inexpensive graphite electrodes over two years of testing when the EHM process includes periodic polarity reversal.

FIG. 1 illustrates the EHM process, according to an embodiment. At a high level, EHM process 100 electrolyzes water to shift pH down, then shift pH up, then shift pH back to neutral, in order to effect desired chemical reactions. Advantageously, EHM process 100 uses electrical current, rather than chemicals, to effect treatment of wastewater.

Thus, embodiments of EHM process 100 can be entirely or substantially chemical-free. In a particular implementation, EHM process 100 may be adapted for use on septic tanks. However, other applications are contemplated as well (e.g., large-scale wastewater treatment plant).

In the illustrated embodiment, EHM process 100 utilizes an electrochemical continuous-flow pilot reactor 110. Reactor 110 comprises a first anodic chamber 112A with a first anode 114A, a second anodic chamber 112B with a second anode 114B, a cathodic chamber 116 with a cathode 118, and a multivalent cation exchange membrane 120 between first and second anodic chambers 112 and cathodic chamber 116.

An electrical power source (not shown) is electrically connected to reactor 110, such that current flows into anodes 114 and out of cathode 118. The power source may comprise a power grid, power generator, battery, and/or the like, and may be configured to supply a constant direct current (DC) voltage to the electrodes. To complete the circuit, calcium, magnesium, and other multivalent cations pass through membrane 120. During the course of the nutrient recovery of EHM process 100, organics (e.g., measured by chemical oxygen demand (COD) and total organic carbon (TOC)) are mineralized, and the water is disinfected.

A wastewater source 102 provides influent to first anodic chamber 112A of reactor 110. In an embodiment, the influent is primary effluent (i.e., raw sewage) that has not been treated except for sedimentation of solids. Such influent provides more efficient phosphorus recovery, since the phosphorus has not been taken up by microorganisms for conversion to organic phosphorus, and nitrogen has not been converted from ammonia to highly soluble nitrate. One example of a wastewater source 102 that provides such influent is a septic tank, which holds settled raw sewage. However, wastewater source 102 may comprise any source of wastewater.

In an embodiment, an influent flow equalization tank 104 is positioned between wastewater source 102 and first anodic chamber 112A. Influent flow equalization tank 104 may be used to equalize or otherwise regulate the hydraulic velocity or flow rate of wastewater through reactor 110. Equalization of the wastewater flow prevents short-term high volumes of influent, called surges, from forcing solids and organic material out of EHM process 100. As an example, the flow rate of wastewater solution throughout process 100 may be equalized to 0.21 gallons per minute (gpm).

The influent from wastewater source 102 flows into first anodic chamber 112A, for example, via influent flow equalization tank 104. In first anodic chamber 112A, first anode 114A converts hydroxide ions to oxygen gas, thereby releasing hydrogen ions into the solution in first anodic chamber 112A and depressing the pH of the solution to approximately 4 to 5. This reaction at anode 114 is represented as follows:

$$\text{Anode: } H_2O \rightarrow 4H^+ + O_2 + 4e^- \qquad (1)$$

At the pH of 4 to 5, bicarbonate ions in the solution in first anodic chamber 112A are converted to carbonic acid. Thus, in an embodiment, a carbon dioxide ($CO_2$) stripping mechanism 130 strips carbon dioxide from the solution to prevent further rapid pH reduction and the consequent migration of hydrogen ions from cathode 118 to anodes 114. $CO_2$ stripping also increases phosphorus recovery by eliminating competition from calcium carbonate precipitation. Any mechanism for $CO_2$ stripping may be used. For example, $CO_2$ stripping mechanism 130 may comprise a stripping column. A gas (e.g., air) is bubbled through wastewater solution in the stripping column to pick up and extract carbon dioxide.

In an embodiment that includes $CO_2$ stripping mechanism 130, effluent from first anodic chamber 112A may pass to cathodic chamber 116 through $CO_2$ stripping mechanism 130. In cathodic chamber 116, hydrogen ions are converted to hydrogen gas ($H_2$), which increases the pH of the solution in cathodic chamber 116 to 10 to 11. Excess hydrogen gas may be vented from cathodic chamber 116. The reaction in cathodic chamber 116 is represented as follows:

$$\text{Cathode: } H_2O + 4e^- \rightarrow 4OH^- + 2H_2 \qquad (2)$$

At the pH of 10 to 11 in cathodic chamber 116, calcium phosphate ($Ca_3(PO_4)_2$) is precipitated. The calcium phosphate precipitate may be filtered by filter module 140 and recovered as fertilizer in phosphate fertilizer collection tank 150.

In addition, at high pH of 10 to 11 of the solution in cathodic chamber 116, soluble ammonium ions are converted to ammonia gas. This ammonia gas that is produced may be stripped under vacuum using a stripping column 160. For example, stripping column 160 may comprise a column (e.g., 3 feet in length) of glass Raschig rings. The stripped ammonia gas may then be delivered to an absorption column 170, in which the ammonia is absorbed in sulfuric acid ($H_2SO_4$) to produce ammonium sulfate fertilizer.

More specifically, the solution may pass from cathodic chamber 116 through a membrane module 142 in filter module 140, through an optional inline filter 144, and into stripping column 160. The solution passes through stripping column 160, where the ammonia gas is stripped out. The resulting solution flows to second anodic chamber 112B for pH neutralization, where it may flow out as effluent through a valve 106 (e.g., for bypass flow during intermittent operation).

The ammonia gas that is stripped out from the solution in stripping column 160 is carried by vacuum to absorption column 170. Sulfuric acid is supplied from sulfuric acid tank 180 to absorption column, such that the ammonia gas in absorption column 170 is absorbed in the sulfuric acid to produce ammonium sulfate fertilizer. Sulfuric acid may be contained in absorption column 170 or may be pumped or otherwise flow through absorption column 170 at a flow rate (e.g., 1 gpm) that is appropriate to the composition and flow rate of the wastewater.

As illustrated, the vacuum to strip the ammonia gas may be implemented as an airflow line that loops through membrane module 142, absorption column 170 and stripping column 160 to push all of the ammonia gas to absorption column 170. In addition, one or more components 172 may be provided between absorption column 170 and stripping column 160, and one or more components 174 may be provided between filter module 140 and absorption column and/or stripping column 160 and absorption column 170. For example, component(s) 172 may comprise a demister, pressure relief with an exhaust flow meter, and/or an airflow meter. Component(s) 174 may comprise a vacuum gauge, an air recirculation pump, and/or a check valve. As an example, airflow between absorption column 170 and stripping column 160 may be maintained at 60 cubic feet per minute (cfm) (e.g., by the air recirculation pump), and airflow through filter module 140 may be maintained at 15 cfm.

2. Experimental Results

2.1. Removal

Experimental results of EHM process 100, performed over three days of testing, are summarized in the tables below, which show influent and effluent concentrations for chemical oxygen demand, total organic carbon, total nitrogen, total phosphorus, phosphate, ammonia, nitrate, and *E. coli*. As shown, EHM process 100 is effective at mineralizing approximately 60% of organics, 90% of nitrogen, 99% of phosphorus, and 95% of *E. coli*.:

| | COD (mg/L) | | TOC (mg/L) | | TN (mg/L) | | TP (mg-P/L) | |
|---|---|---|---|---|---|---|---|---|
| | Influent | Effluent | Influent | Effluent | Influent | Effluent | Influent | Effluent |
| Day 1 | 234 | 97.04 | 81.90 | 34.00 | 42.42 | 5.35 | 2.64 | −0.80 |
| Day 2 | 230 | 76.24 | 66.30 | 23.00 | 42.22 | 4.72 | 2.80 | −0.57 |
| Day 3 | 202 | 73.84 | 46.80 | 25.20 | — | 4.16 | 2.51 | −0.99 |
| Average | 222 | 82.4 | 65.00 | 27.40 | 42.3 | 4.70 | 2.70 | −0.80 |
| Removal | 63% | | 58% | | 89% | | 100% | |

| | PO$_4$ (mg/L) | | NH$_3$ (mg/L) | | | NO$_{3\text{-}}$ (mg/L) | |
|---|---|---|---|---|---|---|---|
| | Influent | Effluent | Influent | Effluent | E. (avg) | Influent | Effluent |
| Day 1 | 9.55 | 0.04 | 29.68 | 1.38 | 2.03 | — | — |
| Day 2 | 9.35 | 0.00 | 29.52 | 1.77 | 1.93 | — | — |
| Day 3 | 9.35 | 0.01 | 31.00 | 2.37 | 2.79 | 0.20 | 0.06 |
| Average | 9.40 | 0.02 | 30.10 | 1.80 | 2.25 | 0.20 | 0.06 |
| Removal | 98% | | 93% | | | 68% | |

| | *E. coli.* (CFU/100 mL) | | | |
|---|---|---|---|---|
| | Influent (1:10$^5$) | Influent (1:10$^6$) | Effluent (1:10$^4$) | Effluent (1:10$^5$) |
| Day 1 | 5.22 × 10$^6$ | 9.00 × 10$^6$ | 4.00 × 10$^5$ | 4.00 × 10$^5$ |
| Day 2 | — | — | 3.00 × 10$^5$ | — |
| Day 3 | 6.33 × 10$^6$ | 6.00 × 10$^6$ | 1.20 × 10$^5$ | 4.00 × 10$^5$ |
| Average | 5.78 × 10$^6$ | 7.50 × 10$^6$ | 2.73 × 10$^5$ | 4.00 × 10$^5$ |
| Removal | 95% | | | |

Figure 2:
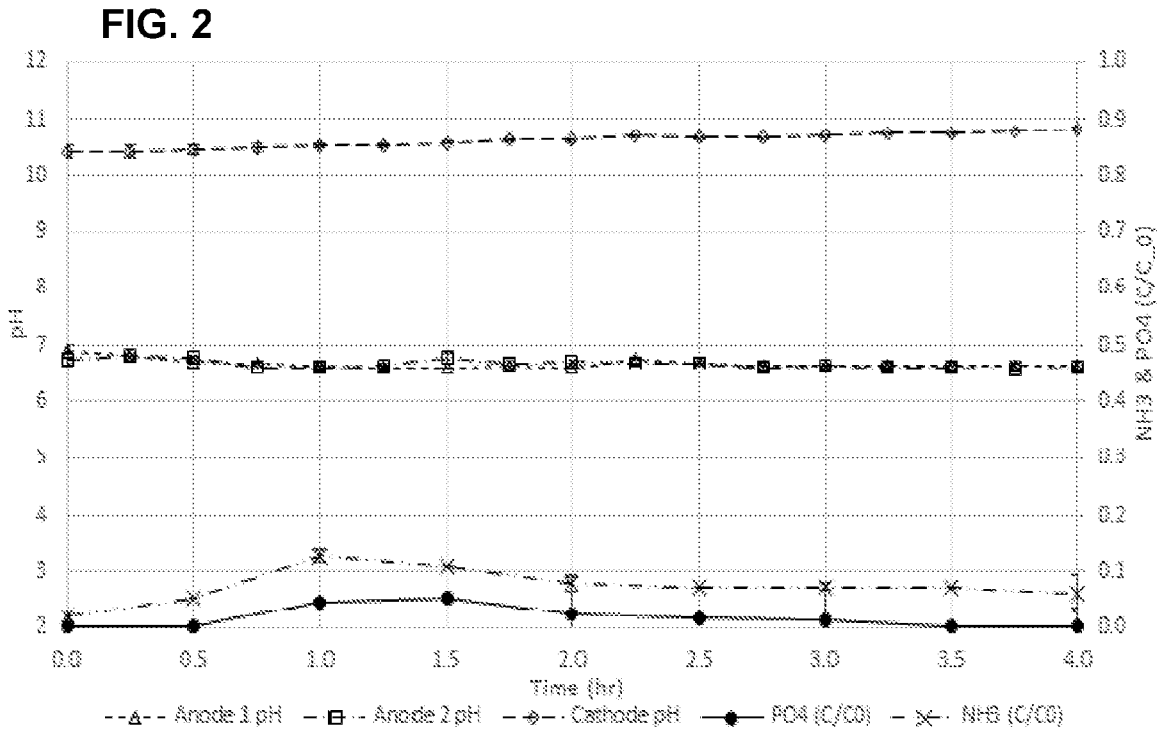
FIG. 2 is a graph representing experimental results of treating conventional primary effluent using the EHM process, according to an embodiment.

FIG. 2 is a graph representing experimental results of treating conventional primary effluent using EHM process 100, according to an embodiment. As demonstrated by the graph, EHM process 100 is stable. In addition, no fouling of inexpensive graphite electrodes was observed over two years of testing, when EHM process 100 includes periodic polarity reversal (e.g., reversal for five minutes after every two-and-a-half hours). On average, 89% of nitrogen and 97% of phosphates were recovered, at an electrochemical energy demand of 0.623 kWh/m³. The total energy demand, including energy for EHM, filtration, ammonia stripping, and absorption, was calculated as 1.21 kWh/m³.

The recovered precipitates were analyzed using EDS and XRD techniques for characterization. These precipitates were found to be amorphous with a Ca/P ratio of 1.95. The Ca/P ratio was dependent on flow rate at a constant voltage. No significant effect of sulfuric acid concentration on ammonia absorption was observed. Therefore, a sulfuric acid dilution with 5.8 molarity (M) is preferred for sulfuric acid tank 180, in order to avoid (NH$_4$)$_2$SO$_4$ crystallization in absorption column 170.

2.2. Energy Analysis

Energy analysis was performed for two flow rates, considering the energy for EHM, filtration, and ammonia stripping and absorption. The results of the energy analysis are summarized in the table below. Energy for EHM was calculated from the average current and voltage measured during the experiments. Energy for microfiltration was obtained from literature, and energy for ammonia stripping an absorption was calculated based on a commercial blower used in a wastewater plant that processes 2.5 million gallons per day (mgd).

| Flow Rate (mL/min) | Energy Required (kWh/m³) | | | Total Energy (kWh/m³) | Nutrient | Average Recovery (%) | Maximum Recovery (%) |
|---|---|---|---|---|---|---|---|
| | EHM | Filtration | Ammonia | | | | |
| 7.53 | 0.827 | 0.25 | 0.218 | 1.30 | N | 88.8 | 92.6 |
| | | | | | P | 96.1 | 99.4 |
| 8.53 | 0.735 | 0.25 | 0.192 | 1.18 | N | 87.6 | 92.3 |
| | | | | | P | 97.0 | 98.6 |
| 4.88 | 0.623 | 0.25 | 0.336 | 1.21 | N | 92.5 | 98.0 |
| | | | | | P | 98.2 | 99.9 |

2.3. XRD Analysis of Precipitates

Figure 3:
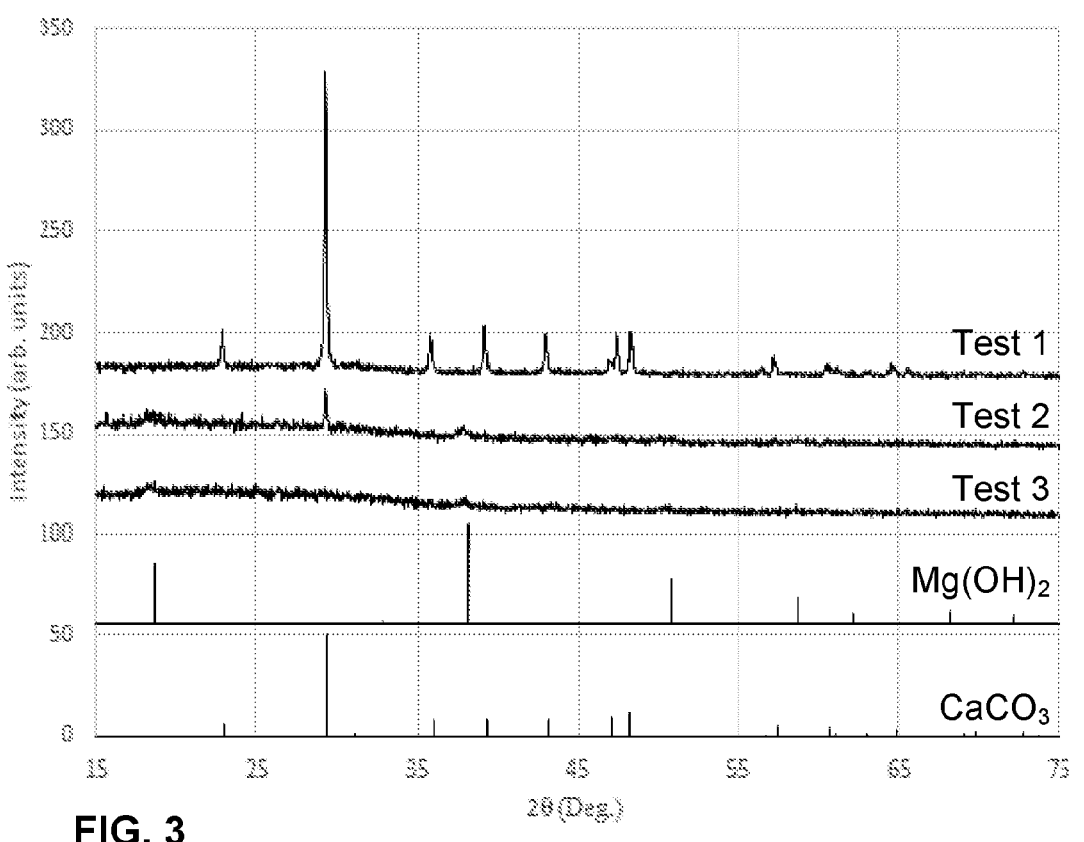
FIG. 3 is a graph representing the results of an analysis performed on precipitates that were recovered by the EHM process, according to an embodiment.

FIG. 3 is a graph representing the results of an XRD analysis performed on precipitates that were recovered by EHM process 100, according to an embodiment. Although reflections, corresponding to calcite and Mg(OH)$_2$, were observed in batch experiments with raw settled sewage, the XRD data of the precipitates from EHM process 100 did not contain any sharp reflections. This indicates that there was no evidence of crystalline material in the precipitates.

The XRD analysis of the recovered precipitates indicated the presence of calcite $(Ca(CO_3))$ and/or $Mg(OH)_2$ in the samples. However, no distinct peaks were observed for calcium phosphate, and no crystalline materials were observed. This indicates that calcium phosphate precipitates had an amorphous morphology. Similar precipitate morphology was observed in Kappel et al., which indicated that crystalline precipitate formation can be inhibited in the presence of humic acid in wastewater.

The XRD results also indicated that $CO_2$ stripping at low pH controls calcite precipitation at cathode 118. Advantageously, this can potentially increase the recovery and purity of the fertilizer that is produced by EHM process 100. Precipitates that were obtained using the test water that had not gone through $CO_2$ stripping at first anode 114 contained a significant amount of calcite (Test 1 in FIG. 3). In contrast, the intensity of calcite peaks was reduced when the test solution underwent $CO_2$ stripping prior to pH shifting (Tests 2 and 3 in FIG. 3). The pH at which carbon dioxide was stripped also influenced calcite precipitation, with calcite content in the precipitates decreasing as the pH, at which the carbon dioxide was stripped, decreased. The solution in cathodic chamber 116, in Tests 2 and 3 in FIG. 3, underwent $CO_2$ stripping until the pH reached 4.65 and 3.93, respectively, and no calcite peaks were detected in Test 3. The final pH at cathode 118 was 9.98 for Test 1, 11.94 for Test 2, and 11.87 for Test 3. These results indicate that $CO_2$ stripping, prior to pH shifting, has a significant impact on the final pH at cathode 118, with pH shifted approximately 2 pH units higher in solutions that underwent prior $CO_2$ stripping.

Mild peaks of $Mg(OH)_2$ were observed in the stripped samples. Prior work has observed $Mg(OH)_2$ precipitation at highly alkaline pH in different applications. See, e.g., Hasson et al.; "Development of the electrochemical scale removal technique for desalination applications," Hasson et al., Desalination 230, 329-42, doi:10.1016/j.desal.2008.01.004, 2008, which is hereby incorporated herein by reference as if set forth in full; "Electrochemical scaling of stainless steel in artificial seawater: Role of experimental conditions on $CaCO_3$ and $Mg(OH)_2$ formation," Karoui et al., Desalination 311, 234-40, doi:10.1016/j.desal.2012.07.011, 2013, which is hereby incorporated herein by reference as if set forth in full; "Electrochemical water disinfection: A short review," Kraft, Platin. Met. Rev. 52, 177-85, doi:10.1595/147106708X329273, 2008, which is hereby incorporated herein by reference as if set forth in full; and "A novel combined electrochemical system for hardness removal," Zhi et al., Desalination 349, 68-72, doi:10.1016/j.desal.2014.06.023, 2014, which is hereby incorporated herein by reference as if set forth in full.

2.4. EDS Analysis of Precipitates

The table below illustrates the results of EDS analysis performed on precipitates that were recovered by EHM process 100, according to an embodiment. The elemental analysis of the precipitates indicated that the Ca/P ratio depends on the pH at first anode 114A, where carbon dioxide is stripped. Results from batch experiments indicated that the precipitates mainly comprise amorphous calcium phosphates and minor amounts of amorphous calcium carbonate. In addition, the results indicate that the Ca/P ratio and crystalline calcite content decrease with decreasing pH at first anode 114A. In fact, the pH at first anode 114A, during the three experiments represented below (i.e., Test 1, Test 2, and Test 3), averaged 6.68, 6.27, and 5.18, respectively.

These results suggest that amorphous calcium phosphate content increases with decreasing pH at first anode 114A, as a result of reduced calcium carbonate contamination of the precipitates.

|  | Test 1 | Test 2 | Test 3 |
|---|---|---|---|
| Carbon (C) | 52.51 | 43.64 | 40.40 |
| Oxygen (O) | 34.88 | 36.65 | 40.45 |
| Sodium (Na) | 0.15 | 0.17 | — |
| Magnesium (Mg) | 0.85 | 5.59 | 4.66 |
| Aluminum (Al) | 0.11 | — | — |
| Silicon (Si) | 0.65 | 1.14 | 1.48 |
| Phosphorus (P) | 2.23 | 4.22 | 4.16 |
| Sulfur (S) | 0.45 | 0.36 | 0.59 |
| Chlorine (Cl) | — | 0.11 | — |
| Calcium (Ca) | 8.17 | 8.13 | 8.26 |
| Sum | 100.00 | 100.00 | 100.00 |
| Ca/P Ratio | 3.66 | 1.93 | 1.98 |

The table below illustrates the results of XRD analysis performed on precipitates that were recovered by EHM process 100, in another set of experiments, according to an embodiment:

|  | Test 1 | Test 2 | Test 3 |
|---|---|---|---|
| Carbon (C) | 35.94 | 43.20 | 47.51 |
| Oxygen (O) | 44.06 | 37.68 | 35.46 |
| Sodium (Na) | 0.12 | — | — |
| Magnesium (Mg) | 0.44 | 5.53 | 5.40 |
| Silicon (Si) | 0.29 | 1.71 | 1.55 |
| Phosphorus (P) | 3.65 | 3.49 | 3.30 |
| Sulfur (S) | 0.70 | 0.25 | 0.24 |
| Chlorine (Cl) | — | 0.08 | 0.08 |
| Calcium (Ca) | 14.78 | 8.06 | 6.46 |
| Sum | 99.98 | 100.00 | 100.00 |
| Ca/P Ratio | 4.0 | 2.3 | 2.0 |

This EDS analysis indicated that the Ca/P ratio of the recovered precipitates reached 2 as the calcite content was reduced through $CO_2$ stripping. In other words, the calcite content of the precipitates decreased across the three tests, such that no crystalline phases of calcite were detected in the sample from Test 3. This is in contrast to Kappel et al., who obtained precipitates containing amorphous calcium carbonate in addition to amorphous calcium phosphate, and for which the Ca/P ratio increased with increasing calcium carbonate precipitation. Furthermore, the solubility of calcium phosphates generally decreases with increasing Ca/P ratio. See, e.g., "Calcium Orthophosphates: Crystallization and Dissolution," Wang et al., Chem. Rev. 108, 4628-69, doi:10.1021/cr0782574, 2008, which is hereby incorporated herein by reference as if set forth in full. For example, brushite (Ca/P=1) is more soluble than hydroxyapatite (Ca/P=1.67). However, calcium phosphate, which is a precursor to the more stable hydroxyapatite, can have a Ca/P ratio of 1.18 to 2.5, and a general chemical formula of $Ca_xH_y(PO_4)_z \cdot nH_2O$, in which n is 3 to 4.5, and there is 15-20% $H_2O$. See, e.g., "Biological and Medical Significance of Calcium Phosphates," Dorozhkin et al., Angew. Chemie Int. Ed. 41, 3130-46, doi:10.1002/chin.200247267, 2002; "Formation and transformation of calcium phosphates: relevance to vascular calcification," LeGeros, Z. Kardiol. 90, 116-24, doi:10.1007/s003920170032, 2001; which are both hereby incorporated herein by reference as if set forth in full; and Wang et al. Considering the measured Ca/P ratio of the precipitates, the observations of Kappel et al., and the reported characteristics of calcium phosphate, the precipitates obtained by EHM process 100 were considered to principally comprise calcium phosphate with minor amounts of calcium carbonate.

2.5. Voltammetry

Figure 4:
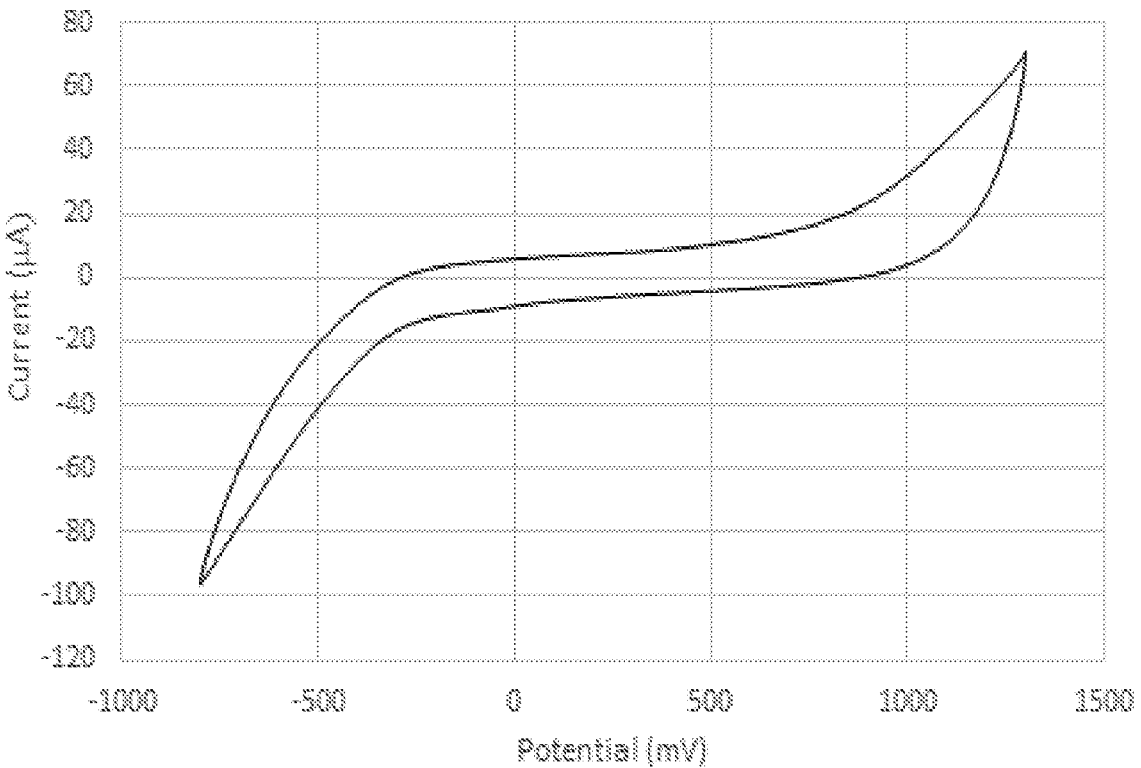
FIG. 4 is a graph representing the results of a voltammetry analysis.

Cyclic voltammetry experiments were conducted on synthetic wastewater, having the composition described elsewhere herein, using an isomolded graphite electrode. The potential was swept from −800 mV to 1300 mV, at a 100 mV/s scan rate, using a Pine Research WaveDriver 20 potentiostat. FIG. 4 is a graph representing the results of the voltammetry analysis in a solution with pH of 8.02 and conductivity of 1866 µS/cm, plotted according to European convention. The voltammetry analysis indicated that the principal reaction taking place in the solution is water electrolysis, as intended. No peaks for additional reactions were observed within the potential window of water electrolysis (i.e., 1.23V).

Electrode fouling is one of the principal issues faced in electrochemical systems. In EHM process 100, some precipitate formation was observed when reactor 110 was run without polarity reversal. However, no significant drop in current was observed. Moreover, the precipitate build-up on cathode 118 was avoided by using polarity reversal. When the electrodes of anodes 112 and cathode 118 were used to treat raw and mineral-spiked settled sewage with self-cleaning by polarity reversal, no precipitate build-up was observed over one-and-a-half years of experimentation.

The lack of electrode fouling by precipitates during long term operation may be partially attributable to the isomolded graphite electrode material that was used for anodes 112 and cathode 118. In particular, unlike rare earth metal oxide coated DSAa (see, e.g., Kappel et al.), isomolded graphite electrodes are stable under polarity reversal. Also, compared to DSAs, isomolded graphite electrodes are inexpensive to replace. Furthermore, the use of a non-toxic electrode material, such as isomolded graphite, is important in wastewater treatment, especially in direct potable reuse applications.

2.6. Analytical Methods

Specific conductance, pH, and temperature were measured by an Orion STAR A329 multiprobe. Samples were analyzed for phosphate, using the Hach high range (1.0-100.0 mg/L $PO_4^{3-}$) total reactive phosphorus TNT reagent set using Method 8114, by a Beckman Coulter DU 720 UV-visible spectrophotometer. Samples taken during experiments with synthetic and actual wastewater were filtered using 0.2 and 0.45 µm meter VWR syringe filters, respectively, before being analyzed for phosphates. Cations were analyzed by atomic absorption using a Perkin Elmer AAnalyst 800. Samples were acidified with concentrated $HNO_3$, and dilutions were prepared with 1% $HNO_3$. Because an air-acetylene flame was used in cation analysis, excess lanthanum from Sigma-Aldrich was added to the samples to prevent interferences from phosphate. All precipitates from the reactor were dried at 103±2° C. Experiments were generally carried out in triplicates.

3. Application to Municipal Wastewater and Septic Systems

Settled raw sewage (e.g., municipal wastewater) is particularly amenable to EHM process 100. For example, settled raw sewage has moderate bicarbonate alkalinity, which provides the necessary buffering of first anodic chamber 112A, while allowing carbon dioxide to be stripped by mechanism 130 to prevent hydrogen ions from migrating from cathodic chamber 116, and which also prevents the precipitation of calcium carbonate from competing with the precipitation of calcium phosphate at cathode 118. In addition, settled raw sewage lacks high concentrations of other minerals that might otherwise interfere with calcium phosphate precipitation.

Groundwater contamination from septic tanks typically comprises elevated nitrate concentrations, and sometimes the migration of microbiological constituents. In areas, such as South Florida, which are ecologically phosphorus-limited, phosphorus may also be a concern. Since EHM process 100 has the ability to remove these constituents, without the need for routine recharging of chemical feed tanks or supervision of chemical metering pumps, EHM process 100 can be incorporated into an add-on for septic tanks. As an add-on to a septic tank, EHM process 100 treats effluent of the septic tank before discharge to groundwater via leach fields. Thus, EHM process 100 may address issues with septic tanks that arise in coastal areas due to rising water tables associated with rising sea levels.

4. Example Construction of Reactor

In an embodiment, reactor 110 may be constructed as a structure with three compartments: first anodic chamber 112A, second anodic chamber 112B, and cathodic chamber 116. It should be understood that chambers 112 and 116 may be constructed in any size, depending on the scale at which it is to be used. First anodic chamber 112A and second anodic chamber 112B may be constructed as a single chamber that is divided into two by an inserted and sealed wall. For experimentation, polymethyl methacrylate (plexiglass) was used as the material for the walls of reactor 110. However, different materials may be used for experimental or operational applications.

Anodic chambers 112 may each be divided from cathodic chamber by a frame (e.g., made from the same material as the walls) that sandwiches membrane 120 therebetween. Membrane 120 may comprise one or more membranes, such as Fumasep-FKS-PET-130, which is reinforced by polyethylene terephthalate (PET), Fumasep-FKE-50, which is not reinforced, CMI-7000, which comprises gel polystyrene cross-linked with divinylbenzene having sulfonic acid functional groups, and/or the like. Anodes 114 and cathode 118 may each comprise one or more isomolded graphite plate electrodes.

5. Optimization of Cell Voltage

To determine an optimum voltage to be used for the electrodes of reactor 110, experiments were conducted using synthetic wastewater in a reactor 110 fabricated with Fumsep-FKS-130 as membrane 120. Synthetic wastewater was prepared by mixing stock solutions in deionized water to represent NZW settled sewage. Stock solutions were prepared using $K_2SO_4$, $KNO_3$, $NaHCO_3$, $MgCl_2 \cdot 6H_2O$, $NH_4Cl$, $KH_2PO_4$, and $CaCl_2 \cdot 2H_2O$. The composition of the synthetic wastewater is shown in the table below. β-tri-calcium phosphate (β-$Ca_3(PO_4)_2$) was used as seed crystals, and American Chemical Society (ACS) or analytical grade chemicals were used in all experiments.

| Synthetic Wastewater Recipe | |
| --- | --- |
| Ion | Concentration (mg/L) |
| $Ca^{2+}$ | 70.0 |
| $Mg^{2+}$ | 12.4 |

17

-continued

| Synthetic Wastewater Recipe | |
|---|---|
| Ion | Concentration (mg/L) |
| $K^+$ | 90.5 |
| $Na^+$ | 145 |
| $NH_4^+$ | 64.7 |
| $PO_4^{3-}$ | 36.0 |
| $SO_4^{2-}$ | 83.6 |
| $NO_3^-$ | 2.41 |
| $Cl^-$ | 142 |
| Alkalinity (as $CaCO_3$) | 319 |

During the voltage optimization experiments using the synthetic wastewater, the polarity of the electrodes was reversed for three minutes every thirty minutes, with the exception that in 3.5V experiments the polarity was reversed for five minutes every thirty minutes. $\beta$-Ca$_3$(PO$_4$)$_2$ seeds were added to cathodic chamber 116, after the pH of the solution in cathodic chamber 116 exceeded 7, to act as a precipitate seed. Notably, even though the voltage at the power source was set to 3.5V, 5.0V, 7.0V, and 10V, during experiments at different voltages, the actual voltages measured between anodes 114 and cathode 118 were lower than the set voltage at the power source due to resistive loss in wires, connections, and the ammeter.

Figure 5:
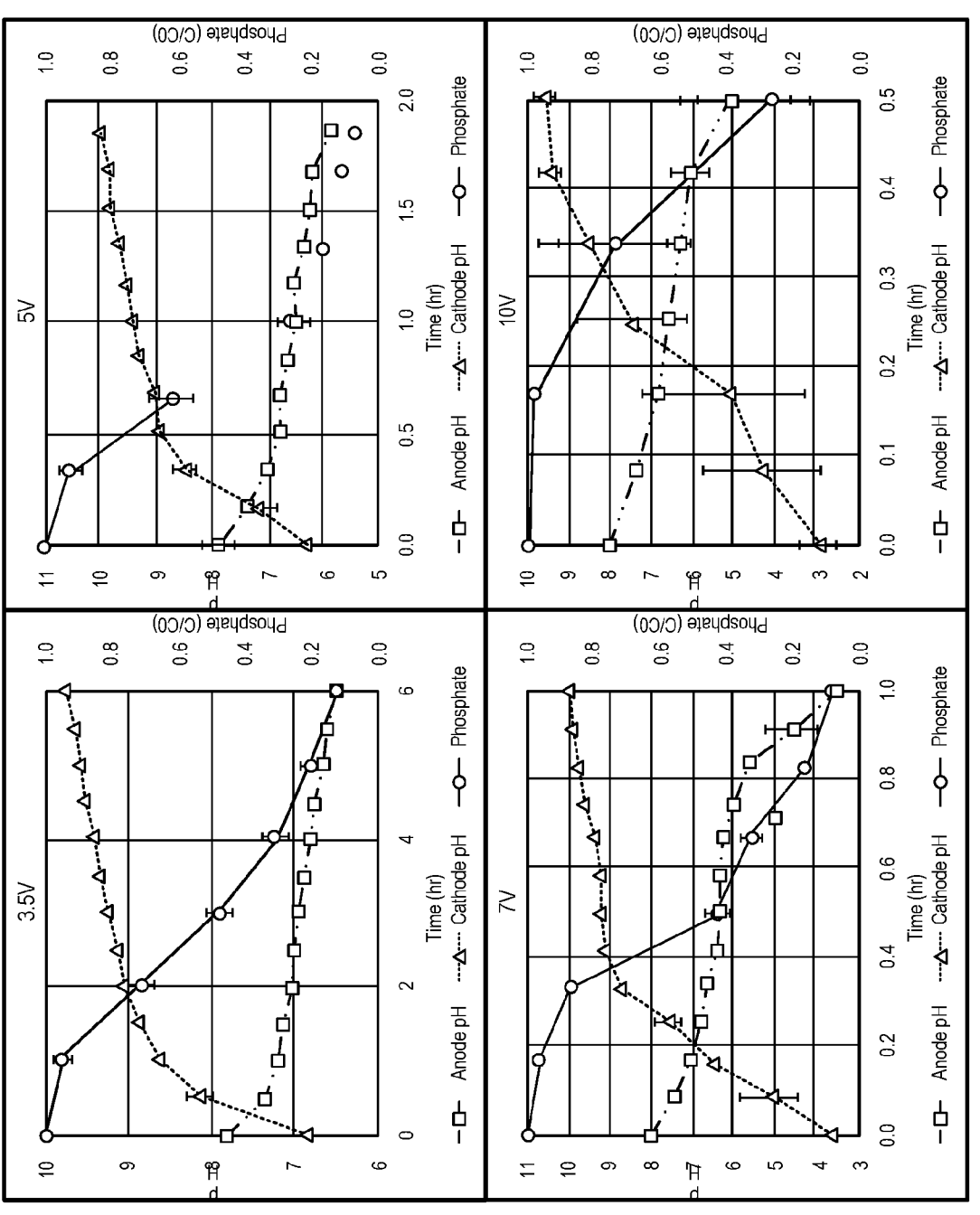
FIG. 5 is a set of graphs that represent the results of voltage optimization experiments for the EHM process, according to an embodiment.

FIG. 5 is a set of graphs that represent the results of the voltage optimization experiments, according to an embodiment. The slow change in pH in first anodic chamber 112A indicates the buffering of pH by the influent alkalinity. In other words, the pH in first anodic chamber 112A was buffered due to the consumption of $H^+$ produced at first anode 114A by reaction (1). The voltage optimization experiments were carried out until the buffering from the alkalinity was lost, except in the case of the 3.5V experiment, which was stopped after three-hundred-sixty minutes due to sluggish kinetics.

$$H_2CO_3^* \leftrightharpoons H^+ + HCO_3^-,\qquad(3)$$

wherein $$H_2CO_3^* = H_2CO_{3(aq)} + CO_{2(aq)}\qquad(4)$$

18

In contrast, the pH in cathodic chamber 116 increased rapidly up to 9, and then more slowly thereafter. This is consistent with the logarithmic pH scale and with the buffering effect of reaction (3).

$$HPO_4^- \leftrightharpoons H^+ + PO_4^{3-}\qquad(5)$$

$$NH_4^+ \leftrightharpoons H^+ + NH_{3(aq)}\qquad(6)$$

An optimum voltage for the pH modulation of EHM process 100 was selected based on the resulting recovery efficiency, energy requirements, and precipitate size. The phosphate removal and energy consumption at each of the different voltages are depicted below:

| | Voltage | | | |
|---|---|---|---|---|
| | 3.5 V | 5 V | 7 V | 10 V |
| Average Voltage (V) | 3.41 | 5.01 | 6.79 | 9.56 |
| Average Current (mA) | 59 | 203 | 427 | 780 |
| Current Density (mA/cm$^2$) | 0.38 | 1.31 | 2.76 | 5.04 |
| Time (min) | 360 | 110 | 60 | 30 |
| Energy per 1 m$^3$ (kWh/m$^3$) | 0.606 | 0.934 | 1.450 | 1.865 |
| Energy per 1000 gallons (kWh/1000 gal) | 2.293 | 3.536 | 5.489 | 7.061 |
| Final Cathode pH | 9.77 ± 0.07 | 10.05 ± 0.05 | 10.43 ± 0.50 | 9.66 ± 0.18 |
| Phosphate Recovery (%) | 83.2 | 90.2 | 93.8 | 78.7 |

± indicates one standard deviation of replicate measurements. Average Voltage indicates the voltage between the electrode plates (i.e., anode 114 and cathode 118). Time indicates the duration of the experiment.

Even though 85.8% of phosphates were recovered with only 0.64 kWh/m$^3$ in the 3.5V experiments, the reaction kinetics were too sluggish for practical purposes, since the pH only shifted to 9.77±0.07 after six hours. On the other hand, higher voltages produced smaller precipitate particles, which potentially hinders separation. Therefore, 5V was selected as the optimum voltage for EHM process 100, considering the recovery efficiency and corresponding energy usage at that voltage.

Precipitates recovered from the synthetic wastewater by EHM process 100, in which a CMI-7000 membrane was used as membrane 120, were observed using a scanning electron microscope (SEM) to study the size and morphology of the precipitates. All precipitates were recovered by centrifuging settled precipitates and drying at 103±2° C. Micrographs were obtained using an FEI/Philips XL-30 Field Emission ESEM. The elemental composition of the precipitates was obtained by EDS using a JOEL JSM 6010PLUS/LA SEM. The mineral composition of the precipitates was analyzed based on XRD patterns obtained by a Philips X'Pert MPD diffractometer using Cu radiation, and XRD patterns were analyzed using QualX version 2.23 software and the PowCod Inorganic 1710 database. Both seeded and non-seeded samples were analyzed for comparison.

Figure 7:
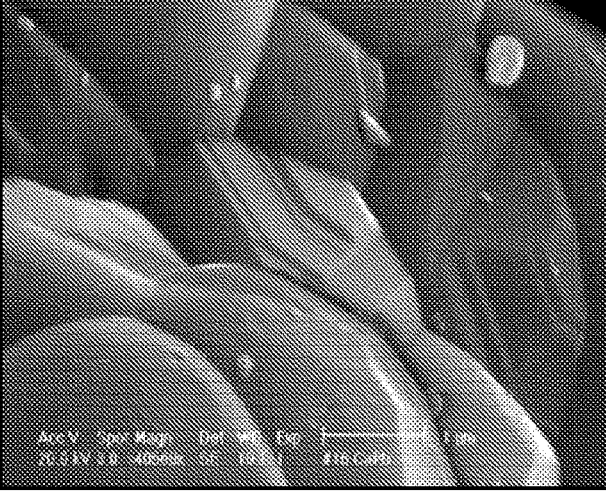
FIG. 7 is a micrograph of seed crystals.

FIGS. 6A-6D are SEM micrographs of precipitates obtained using synthetic wastewater for 3.5V, 5V, 7V, and 10V experiments, respectively, according to an embodiment. These micrographs indicate that the precipitates had an amorphous morphology. It can be seen that the size of precipitates decreased as the voltage increased. This result can be attributed to the reduction in reaction time accompanying increases in voltage. When operating at the optimum voltage of 5V, precipitates can be separated by microfiltration that retains particles greater than 0.1 μm. Notably, the background surfaces seen in FIGS. 5B and 5C correspond to the β-$Ca_3(PO_4)_2$ seed crystals, indicating that the seed crystals act as a surface for precipitate nucleation. FIG. 7 is a micrograph of β-$Ca_3(PO_4)_2$ seed crystals.

Precipitate analysis was also conducted without mineral spiking or seeding. In these cases, reactor 100 had to be run for six hours, instead of two hours, at 5V, to reach the end of bicarbonate buffering, due to the conductivity of the settled raw sewage (904±17 μS/cm) being 36% lower than mineral-spiked settled sewage (1414±106 μS/cm).

6. Comparison of Multivalent Cation Exchange Membranes

Experiments for comparing different membranes 120 were carried out using actual settled sewage, that was spiked with minerals, to simulate NZW settled sewage. The composition of the sewage and spiked sewage used in the experiments is listed below:

| Ion | Raw Settled Sewage (mg/L) | Mineral-Spiked Settled Sewage (mg/L) |
| --- | --- | --- |
| $Ca^{2+}$ | 19.36 ± 0.59 | 58.06 ± 1.00 |
| $Mg^{2+}$ | 5.39 ± 0.29 | 11.05 ± 0.31 |
| $K^+$ | 15.95 ± 0.17 | 78.00 ± 6.08 |
| $Na^+$ | 51.98 ± 1.23 | 97.04 ± 2.71 |
| $PO_4^3$ | 12.17 ± 1.35 | 17.29 ± 0.67 |
| Alkalinity (as $CaCO_3$) | 189.8 | 183.1 ± 9.4 |

Figure 8:
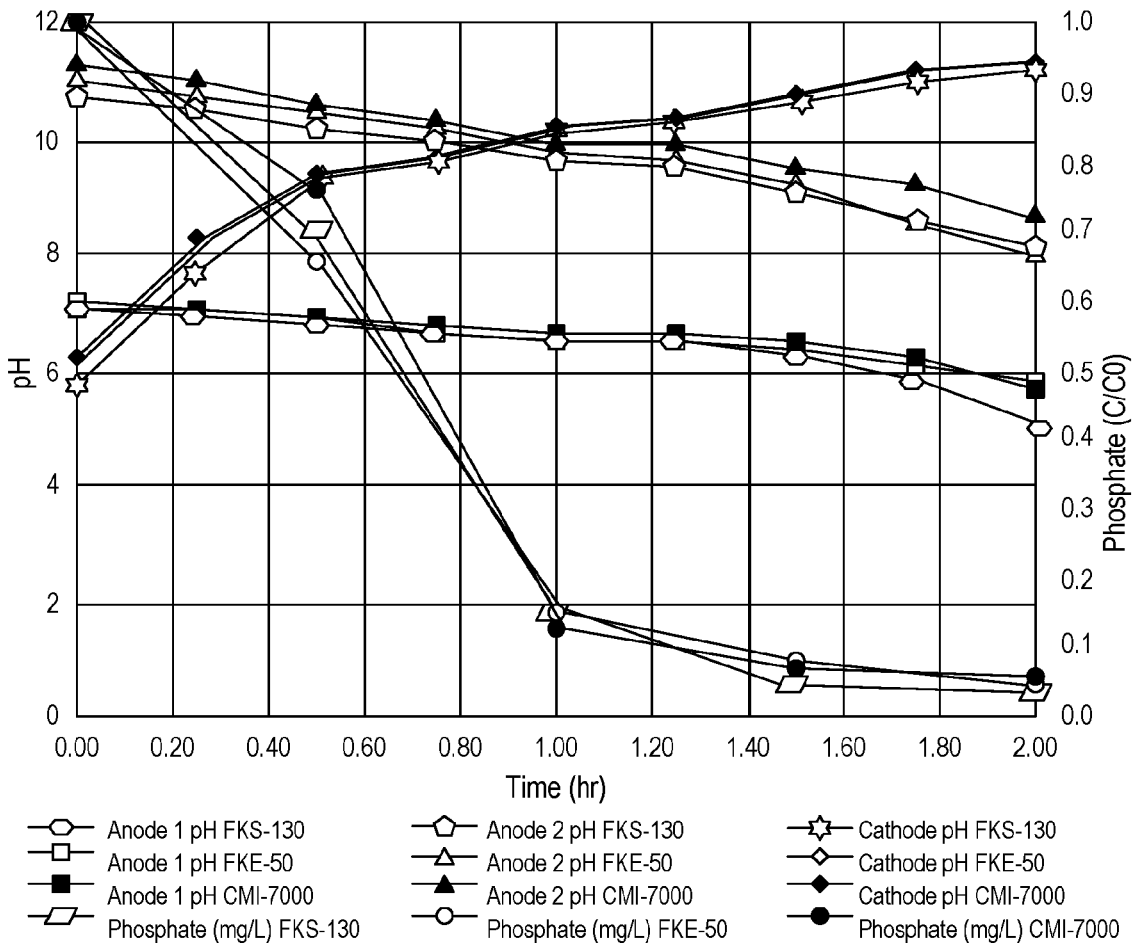
FIG. 8 is a graph representing experimental results using different membranes in the EHM process, according to an embodiment.

FIG. 8 is a graph representing the results of the experiments using Fumasep-FKS-130, Fumasep-FKE-50, and CMI-7000 membranes as membrane 120, with operation at 5V and polarity reversed for five minutes every hour, according to an embodiment. The results indicate that, regardless of the membrane used, 90% phosphate removal was achieved after just one hour of operation at 5V. The Fumasep-FKS-130 and Fumasep-FKE-50 membranes produced very similar results in terms of pH at cathode 118, while the CMI-7000 membrane produced slightly higher pH under the same conditions. Notably, the Fumasep-FKE-50 membrane was very thin, compared to the other two membranes that were tested, and failed after three experiments at the seal near its frame. Similar results with all three multivalent cation exchange membranes indicate the robustness of EHM process 100 and the independence of phosphate recovery with respect to the particular membrane used for membrane 120.

Figure 9:
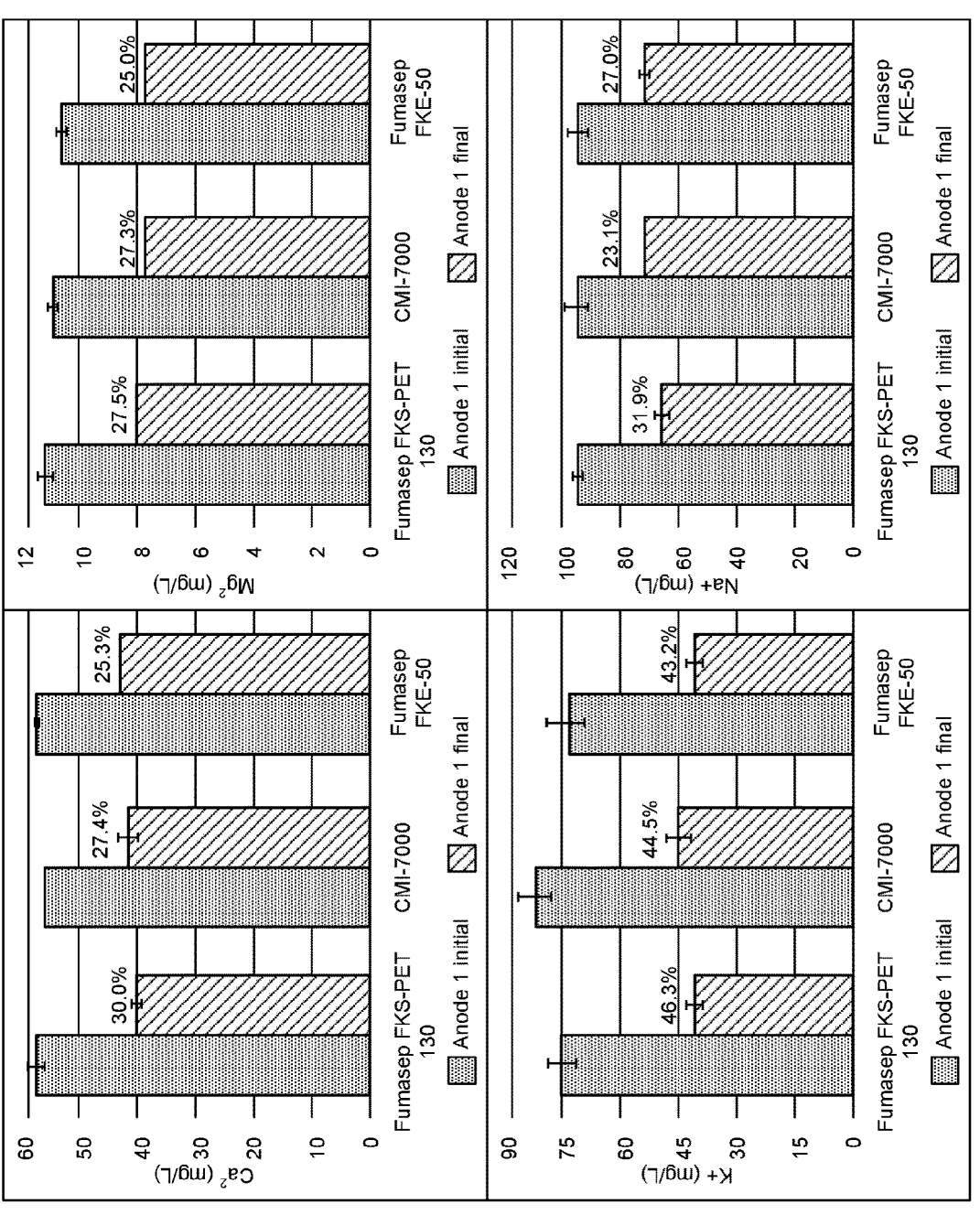
FIG. 9 is a set of charts that illustrate the initial and final concentrations and migration efficiency of different cations using different membranes in the EHM process, according to an embodiment.

The performance of the membranes was assessed by their cation migration efficiency (CME), which was defined as follows:

$$\eta_i = \frac{c_{i,i} - c_{i,f}}{c_{i,i}} \times 100\%, \qquad (7)$$

wherein $\eta_i$ is the migration efficiency of the i-th cation, wherein $C_{i,i}$ is the initial concentration of the i-th cation in first anodic chamber 112A, and wherein $C_{i,f}$ is the final concentration of the i-th cation in first anodic chamber 112A. FIG. 9 is a set of charts that illustrate the initial and final concentrations of calcium, magnesium, potassium, and sodium, respectively, and the migration efficiency of each cation, for each tested membrane, according to an embodiment. The results indicate that the Fumasep-FKS-130 membrane had the highest CME. The Fumasep-FKE-50 membrane had the lowest CME, except with respect to $Na^+$. The CMI-7000 membrane had moderate CME.

The energy consumption of EHM process 100, using the different membranes, was also measured, as depicted, along with phosphate recovery, in the table below:

| | Membrane | | |
| --- | --- | --- | --- |
| | Fumasep-FKS-130 | CMI-7000 | Fumasep-FKE-50 |
| Average Current (mA) | 208.9 | 208.5 | 211.1 |
| Current Density (mA/cm²) | 1.3491 | 1.3467 | 1.3634 |
| Energy per 1 m³ (kWh/m³) | 1.048 | 1.046 | 1.060 |
| Energy per 1000 gallons (kWh/1000 gal) | 3.968 | 3.960 | 4.012 |
| Final Cathode pH | 11.25 ± 0.15 | 11.38 ± 0.09 | 11.22 ± 0.21 |
| Phosphate Recovery (%) | 96.8 | 94.0 | 94.9 |

Average voltage during each experiment was 5.02 V

While the phosphate recovery of the CMI-7000 membrane was slightly low compared to the other membranes, mineral analysis indicated that the $Ca^{2+}$ concentration of the influent wastewater used with the CMI-7000 membrane was slightly low compared to the wastewater used with the other membranes. This likely caused the slightly lower phosphate recovery for the CMI-7000 membrane. Thus, CMI-7000 was selected as the optimum membrane for membrane 120 in EHM process 100, due to its high cathode pH and low energy consumption.

Notably, the use of multivalent cation exchange membrane 120 significantly reduced the energy consumption and electrode area requirement, compared to previous work on electrochemical phosphate recovery. For example, Cid et al. reported an energy consumption of 30±5 kWh/m³ for phosphate recovery from toilet wastewater (i.e., black water). In addition, the process in Cid et al. required 34 m²/m³ of electrode surface area to achieve 60% phosphate recovery in two hours. However, EHM process 100, using multivalent cation exchange membrane 120, consumed only 1.046 kWh/m³ of energy for phosphate recovery from mineral-spiked settled sewage, and required only 7.74 m²/m³ of electrode surface area to achieve 94% phosphate recovery in two hours. Furthermore, 95% phosphate recovery was achieved in settled raw sewage, without mineral spiking or seeding, with the same electrode surface area, using 1.863 kWh/m³ over six hours.

Figure 10:
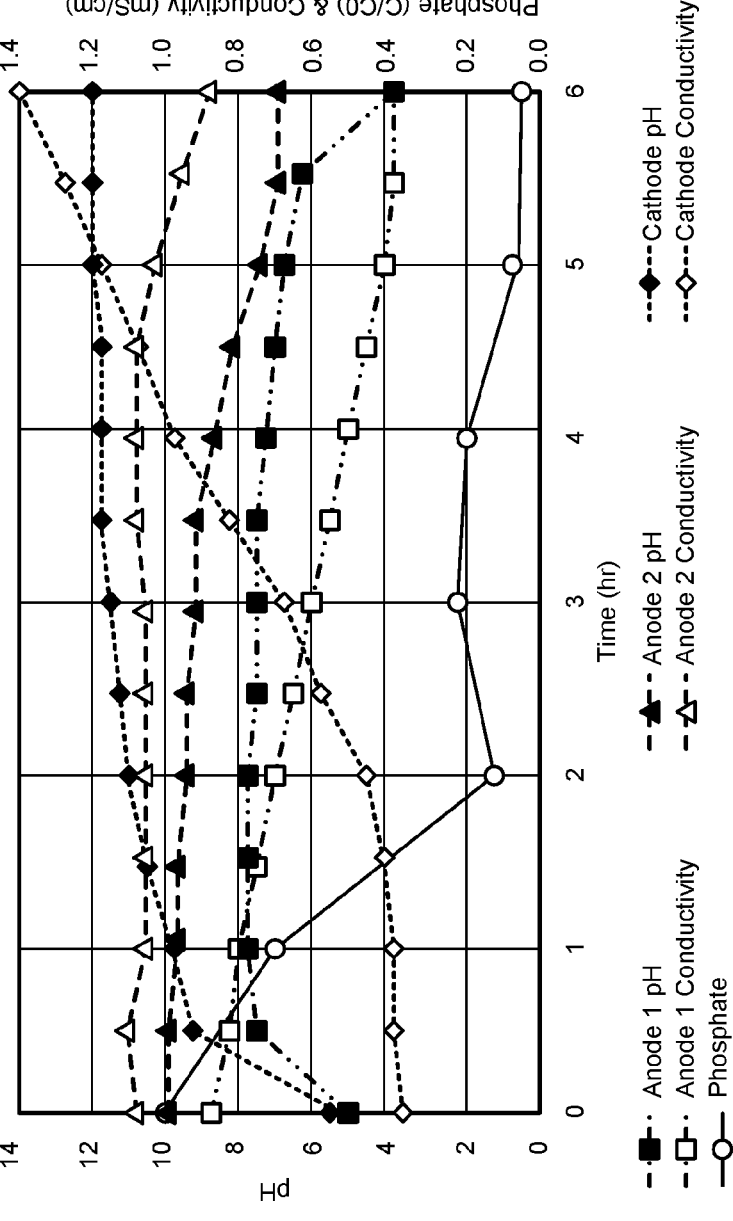
FIG. 10 is a graph representing conductivity in chambers of the EHM process, according to an embodiment.

FIG. 10 is a graph representing conductivity in each anodic chamber 112 and cathodic chamber 116, according to an embodiment of EHM process 100, conducted at 5V for six hours with actual settle raw sewage and the polarity reversed for five minutes every two-and-half hours and at six hours. The conductivity at first anode 114A decreased linearly for 5.5 hours of treatment, indicating that the cations had migrated to cathodic chamber 116, as corroborated by the results in FIG. 8. The conductivity at first anode 114A increased slightly in the sample taken at the sixth hour, because of the increased $H^+$ concentration as the pH dropped to 3.93. The conductivity at cathode 118 was mostly stable during the first two hours, indicating $PO_4^{3-}$ precipitation and migration of $Ca^{2+}$. After two hours, the conductivity at cathode 118 increased linearly as the cations migrated and OH was constantly generated at cathode 118. The conductivity at second anode 114B remained mostly stable for four hours, due to the buffering of the remaining fine phosphate and carbonate precipitates in the solution in second anodic chamber 112B. After four hours, conductivity at second anode 114B began decreasing after all of the remaining precipitates were dissolved and the buffering capacity of the solution was lost.

Power consumption of EHM process 100 increased by 78% in these experiments due to the lower conductivity of raw settled sewage. Power consumption for raw settled sewage was calculated as 1.863 kWh/m³ (7.054 kWh/1000 gal). However, the rate of phosphate recovery reached 95% after five hours. The slight increase in phosphate in samples taken at the third and fourth hours was probably caused by the dissolution of precipitates formed on the electrode surface of cathode 118 during the polarity reversal after two-and-a-half hours. However, only a small portion of the precipitates were formed on cathode 118, as compared to the results of Cid et al. in which precipitate formed principally on the electrode surface of the cathode.

7. Electrolyzer

Figure 11A:
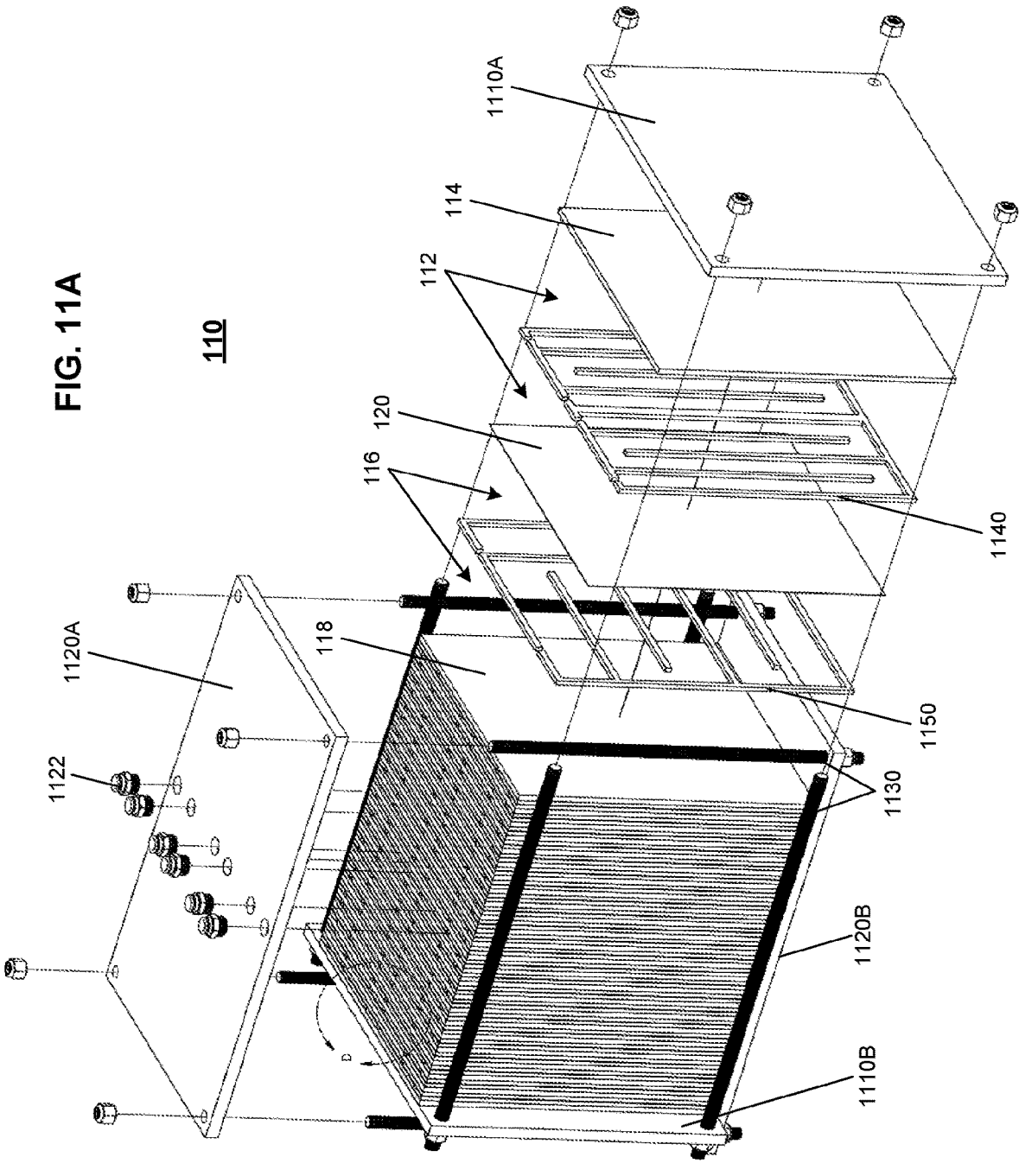
FIGS. 11A and 11B are an exploded perspective view and close-up partial perspective view, respectively, of an electrolyzer that may be used in the EHM process, according to an embodiment.
Figure 11B:
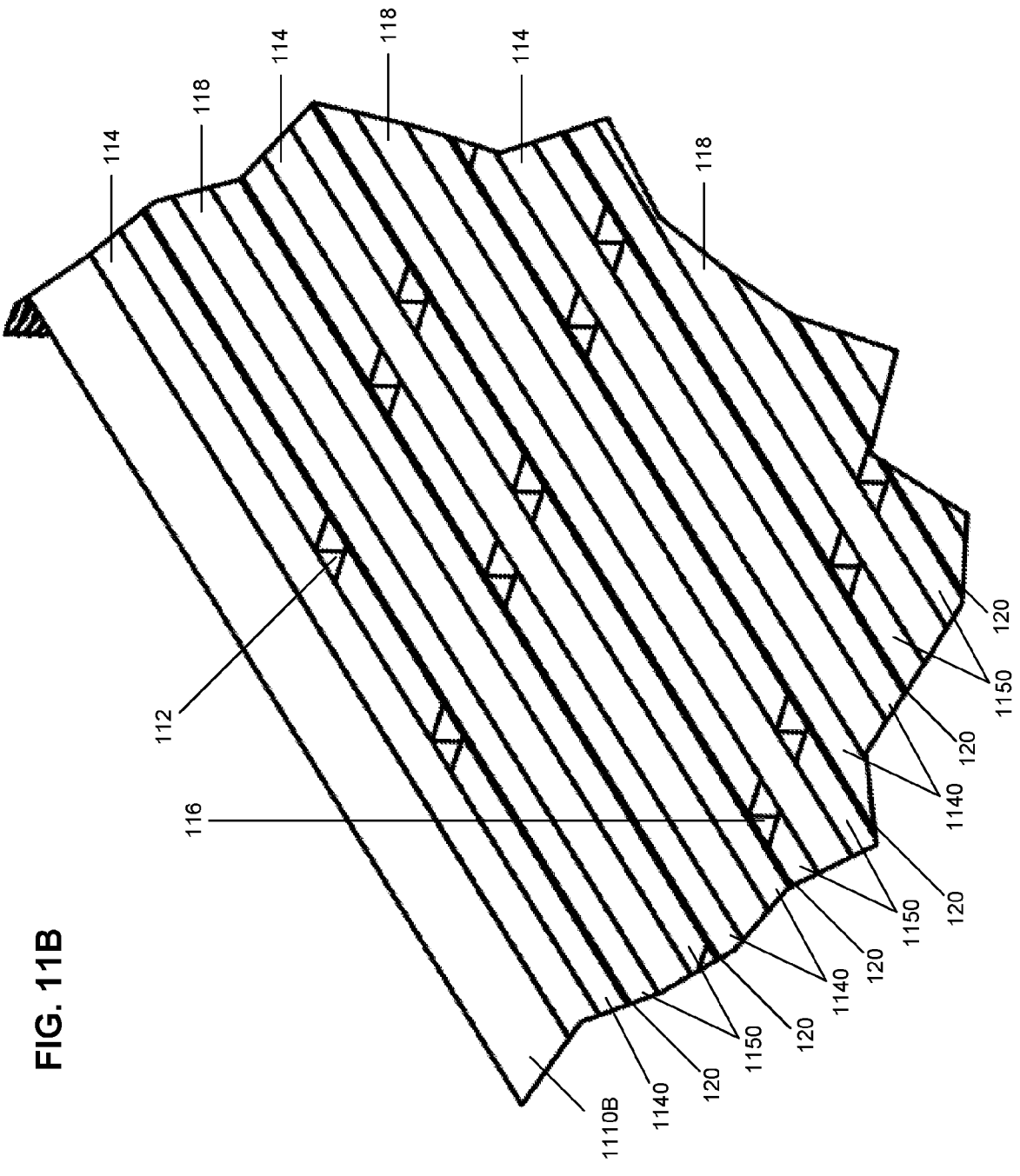

FIG. 11A is a partial exploded perspective view of an electrolyzer cell stack that may be used as one implementation of continuous-flow pilot reactor 110 in EHM process 100, according to an embodiment. FIG. 11B is a close-up view of the area within circle D in FIG. 11A, according to an embodiment. In the embodiment illustrated in FIGS. 11A and 11B, reactor 110 comprises a plurality of cells, wherein each cell comprises at least one anodic chamber 112 (e.g., a pair of first anodic chamber 112A and second anodic chamber 112B), anode 114, cathodic chamber 116, cathode 118, and multivalent cation exchange membrane 120. The plurality of cells may be connected hydraulically in parallel or in series to achieve a total electrode surface area that is appropriate for the composition and flow rate of the wastewater for which reactor 110 is designed, as well as for manufacturability.

Notably, the plurality of cells can be configured in a variety of ways, such that any chamber can potentially serve as an anodic chamber 112 or cathodic chamber 116, as long as anodes 114 and cathodes 116 alternate. The orientation or direction of each cell may also alternate along the longitudinal axis of the cells, such that adjacent cells share an electrode. For example, in a single direction along the longitudinal axis of an electrolyzer cell stack, a first cell may be oriented from anode 114 to cathode 118, whereas a second cell that is adjacent to the first cell may be oriented from cathode 118 to anode 114, such that the first cell and the second cell share the same cathode 118 (e.g., opposing surfaces of the same cathode 118). This may continue the entire length of the cell stack, such that a third cell, adjacent to the second cell on the opposite side of the second cell than the first cell, is oriented from anode 114 to cathode 118 and shares a single anode 114 with the second cell, a fourth cell, adjacent to the third cell on the opposite side of the third cell than the second cell, is oriented from cathode 118 to anode 114 and shares a single cathode 118 with the third cell, and so on and so forth for the length of the electrolyzer cell stack.

In the illustrated embodiment, reactor 110 may comprise a plurality of cells stacked together between a first securement end plate 1110A and a second securement end plate 1110B. A top plate 1120A and bottom plate 1120B may extend along opposing sides of the stack of cells between the securement end plates 1110. The securement plates 1110 may be connected to each other and to the top and bottom plates 1120 via a plurality of securement rods 1130 (e.g., eight rods extending along eight corners of the stack of cells between plates 1110 and between plates 1120), to thereby hold the stack of cells in place. Top plate 1120A may comprise one or more holes configured to receive push-to-connect fittings 1122, through which wastewater may enter and/or exit the plurality of cells (e.g., via lines connected to fittings 1122).

Each cell in the plurality of cells may comprise one surface of an anode 114, an anode gasket 1140 defining at least one flow path representing at least one anodic chamber 112 adjacent to anode 114, a multivalent cation-exchange membrane 120 adjacent to anode gasket 1140, a cathode gasket 1150 defining at least one flow path representing cathodic chamber 116 on the opposite side of multivalent cation-exchange membrane 120 as anode gasket 1140, and one surface of a cathode 118 adjacent to cathode gasket 1150. Notably, anode gasket 1140 is sandwiched between anode 114 and membrane 120, and cathode gasket 1150 is sandwiched between cathode 118 and membrane 120. Each gasket defines a flow path between membrane 120 and its respective electrode that is orthogonal to the plane of membrane 120. In addition, each gasket comprises at least two openings in at least one side, with at least one opening representing an inlet for wastewater and at least one different opening representing an outlet for the wastewater.

In the illustrated embodiment, anode gasket 1140 defines two separate and distinct flow paths. One of the flow paths represents anodic chamber 112A, whereas the other flow path represents anodic chamber 112B. Accordingly, anode gasket 1140 comprises a first inlet and a first outlet for the first flow path representing anodic chamber 112A, and a second inlet and a second outlet for the second flow path representing anodic chamber 112B. In contrast, cathode gasket 1150 defines a single flow path with a single inlet and a single outlet. For simplicity, all of the inlets and outlets may be on a single side of reactor 110. However, other configurations of the inlets and outlets are possible, including more inlets and outlets, inlets and outlets on different sides, and/or the like. It should be understood that fittings 1122 provide ingress into the inlets of gaskets 1140 and 1150 and egress out of the outlets of gaskets 1140 and 1150.

8. Conclusion

Although phosphate recovery from wastewater may be economically challenging, relative to the current cost of commercial fertilizer production, the economics of recovery is favorable when environmental impacts are considered. See, e.g., "Total value of Phosphorus Recovery," Mayer et al., Environ. Sci. Technol. 50, 6606-20, doi:10.1021/acs.est.6b01239, 2016; "Economic feasibility study for phosphorus recovery processes," Molinos-Senante et al., Ambio 40, 408-16, doi:10.1007/s13280-010-0101-9, 2011; which are both hereby incorporated herein by reference as if set forth in full. In fact, "Towards global phosphorus security: A systems framework for phosphorus recovery and reuse options," Cordell et al., Chemosphere 84, 747-58, doi:10.1016/j.chemosphere.2011.02.032, 2011, which is hereby incorporated herein by reference as if set forth in full, indicated that human intervention in the phosphorus cycle has caused the solubilization of 0.5 tonnes of phosphorus over the past half century, and the resultant water pollution has become the main driver for sustainable phosphorus use that involves recovery from waste streams and reuse as fertilizer. For example, commercial nitrogen fertilizer production consumes 143 MJ/kg-N, whereas EHM nitrogen recovery from conventional sewage and NZW would consume 151 and 99 MJ/kg-N, respectively. Commercial phosphorus fertilizer production consumes 36 MJ/kg-P of primary energy, whereas EHM phosphorus recovery from conventional sewage and NZW would consume 298 and 230 MJ/kg-P of primary energy, respectively.

In comparison to previously reported electrochemical phosphorus recovery studies, the disclosed EHM process 100 operates with moderate energy demand at a low current density. The table below compares energy of different electrochemical phosphorus recovery technologies, including EHM process 100, when operated at about pH 11, which would be ideal for simultaneous ammonia recovery by stripping and absorption:

| | | Process | | |
|---|---|---|---|---|
| | Kappel | Gorni-Pinkesfeld | Cid | EHM process 100 |
| Current Density (mA/cm²) | 2.27 | 12 | 15 | 1.347 |
| Energy per 1 m³ (kWh/m³) | 0.195 | 2.9 | ~40 | 1.046 |
| Energy per 1000 gallons (kWh/1000 gal) | 1.420 | 10.98 | ~151 | 3.960 |
| Final Cathode pH | 11.00 | 11.30 | N/A | 11.34 |
| PO₄ Recovery (%) | 96.0 | 96.5 | 75.0 | 94.0 |

Kappel et al. employed electrochemical pH adjustment using conventional cation exchange membranes and precipitation from nanofiltration concentrates. Gorni-Pinkesfeld et al. used pH adjustment and precipitation from secondary effluent (i.e., treated wastewater). Cid et al. used cathodic precipitation from secondary effluent (i.e., blackwater) in an undivided cell. Final cathode pH was not applicable to Cid et al., since bulk pH was not shifted in Cid et al.

The lowest energy consumption was reported by Kappel et al. Specifically, the process in Kappel et al. consumed about five times less energy than EHM process 100. This low energy consumption was attributed to the platinum anode and steel cathode employed by Kappel et al., which greatly reduced the overpotential for the water electrolysis reaction. However, the use of expensive electrode materials in wastewater treatment may be prohibitive, and non-mechanical electrode cleaning techniques, such as polarity reversal, cannot be used with steel cathodes. Furthermore, the wastewater used to test EHM process 100 was highly buffered and had an average alkalinity of 183 mg/L as CaCO₃, whereas the nanofiltration concentrates used in Kappel et al. only had an alkalinity of 26 mg/L as CaCO₃.

Although the conductivity (1414 µS/cm) of the mineral-spiked settled sewage, used to test EHM process 100, was lower than the conductivity (1740 µS/cm) of the simulated secondary effluent used in Gorni-Pinkesfeld et al., the energy used by EHM process 100 to shift pH to 11.3 was 177% lower than the energy used in Gorni-Pinkesfeld et al. Furthermore, EHM process 100 operated at a lower current density to achieve the same final cathode pH. Theoretically, the energy use in Gorni-Pinkesfeld et al. should be lower than in EHM process 100, because the DSA anode and stainless-steel cathode used in Gorni-Pinkesfeld et al. should reduce the overpotential for the water electrolysis reaction, and the higher conductivity of the test water should reduce the resistive losses. However, the lower energy consumption in EHM process 100 can be attributed to the reduction of buffering capability of wastewater, due to CO₂ stripping in first anodic chamber 112A at low pH, prior to pH shifting in cathodic chamber 116.

Electrochemical processes are even more energy efficient for the recovery of nutrients from highly mineralized wastewater effluent, such as the wastewater produced in advanced oxidation-based NZW systems. Because reverse osmosis is not required, treatment plants can produce mineral water containing on the order of 500 mg/L of total dissolved solids, with correspondingly higher conductivity, resulting in lower losses in the electrochemical process. In addition to energy benefits, electrochemical phosphate recovery may have operational advantages over conventional phosphate recovery in decentralized treatment plant applications, such as NZW plants which are economical for as few as one-hundred to one-thousand homes. See, e.g., "Principles for scaling of distributed direct potable water reuse systems: a modeling study," Guo et al., Water Res. 75, 146-63, doi: 10.1016/j.watres.2015.02.033, 2015, which is hereby incorporated herein by reference as if set forth in full.

EHM process 100, as described herein, can recover phosphorus precipitate from raw settled sewage (e.g., mineral-spiked), with one or more of the following features:

94+% phosphate recovery using as little as 1.046 kWh/m³ (3.960 kWh/1000 gallons).

CMI-7000 or Fumasep-FKS-130 membranes as membrane 120, since both offer sufficient mechanical strength and high performance in terms of cation migration.

Operation at 5V or 7V, since both resulted in good process kinetic performance. However, 5V operation used slightly less energy in experiments.

Inexpensive, non-toxic isomolded graphite electrodes as anodes 112 and cathode 118, since these were effective and found to not be sensitive to fouling. Specifically, no fouling was observed after two years of intermittent testing, when polarity was periodically reversed.

As indicated by SEM, EDS, and XRD analysis, the precipitates primarily comprised calcium phosphate, with minor amounts of calcium carbonite, exhibiting an overall Ca/P ratio of approximately 2.

Depression of pH in first anodic chamber 112A using CO₂ stripping prior to pH elevation and phosphate precipitation. As indicated by XRD analysis, this prior CO₂ stripping eliminated the competition between phosphate and carbonate for precipitation with calcium, thereby increasing the purity of the fertilizer product.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A system for electrohydromodulation of wastewater, the system comprising:
    a first anodic chamber configured to receive a flow of wastewater;
    a first anode in contact with the first anodic chamber;
    a cathodic chamber configured to receive the flow of wastewater;
    a cathode in contact with the cathodic chamber;
    a first multivalent cation exchange membrane between the first anodic chamber and the cathodic chamber, wherein the multivalent cation exchange membrane allows multivalent cations to pass therethrough while preventing monovalent ions to pass therethrough; and
    a power source electrically coupled to the first anode and the cathode, wherein the power source is configured to apply a voltage across wastewater in the first anodic chamber and the cathodic chamber, to thereby cause multivalent cations in the wastewater to pass through the multivalent cation exchange membrane, wherein the cathodic chamber is configured to receive the flow of wastewater after the first anodic chamber, the system further comprising: a second anodic chamber configured to receive the flow of wastewater after the cathodic chamber; a second anode in contact with the second anodic chamber; and a second multivalent cation exchange membrane between the second anodic chamber and the cathodic chamber.

2. The system of claim 1, further comprising a carbon dioxide stripping column connected to the first anodic chamber, so as to receive wastewater from the first anodic chamber and return wastewater to either the first anodic chamber or the cathodic chamber, wherein the carbon dioxide stripping column strips carbon dioxide from the wastewater passing therethrough.

3. The system of claim 1, wherein the first and second multivalent cation exchange membranes are separate and distinct from each other.

4. The system of claim 1, further comprising a filter connected to the cathodic chamber, so as to receive the flow of wastewater from the cathodic chamber, wherein the filter extracts phosphate precipitates from the wastewater as it flows from the cathodic chamber to the second anodic chamber.

5. The system of claim 4, further comprising a phosphate fertilizer collection tank, wherein the filter provides the extracted phosphate precipitates to the phosphate fertilizer collection tank.

6. The system of claim 4, wherein the second anodic chamber further comprises an effluent flow path configured to dispense the filtered wastewater out of the second anodic chamber.

7. The system of claim 6, wherein the first anodic chamber is configured to receive wastewater from a septic tank, and wherein the second anodic chamber is configured to dispense the filtered wastewater to a leach field.

8. The system of claim 4, further comprising an ammonia stripping column connected between the filter and the second anodic chamber, so as to receive the filtered wastewater from the filter before the filtered wastewater flows to the second anodic chamber, wherein the ammonia stripping column strips ammonia gas from the wastewater passing therethrough.

9. The system of claim 8, wherein the ammonia stripping column comprises a plurality of Raschig rings.

10. The system of claim 8, further comprising:
    an absorption column; and
    a gas line;
    wherein the gas line circulates a gas through the ammonia stripping column to extract the ammonia gas from the wastewater passing through the ammonia stripping column, and provides the extracted ammonia gas to the absorption column.

11. The system of claim 10, further comprising a sulfuric acid tank configured to supply sulfuric acid through the absorption column to produce ammonium sulfate.

12. The system of claim 11, wherein the sulfuric acid is a sulfuric acid dilution with 5.8 molarity.

13. The system of claim 1, further comprising an influent flow equalization tank, positioned between a wastewater source and the first anodic chamber, wherein the influent flow equalization tank is configured to equalize a flow rate of the flow of wastewater through the first anodic chamber and the cathodic chamber.

14. The system of claim 1, wherein each of the first anode and the cathode comprises an isomolded graphite electrode.

15. The system of claim 1, wherein the first multivalent cation exchange membrane comprises gel polystyrene cross-linked with divinylbenzene having sulfonic acid functional groups.

16. The system of claim 1, wherein the first multivalent cation exchange membrane is reinforced by polyethylene terephthalate (PET).

17. The system of claim 1, wherein the applied voltage is between 5 volts and 7 volts.

18. A system for electrohydromodulation of wastewater, the system comprising: a first anodic chamber configured to receive a flow of wastewater; a first anode in contact with the first anodic chamber; a cathodic chamber configured to receive the flow of wastewater; a cathode in contact with the cathodic chamber; a first multivalent cation exchange membrane between the first anodic chamber and the cathodic chamber, wherein the multivalent cation exchange membrane allows multivalent cations to pass therethrough while preventing monovalent ions to pass therethrough; and a power source electrically coupled to the first anode and the cathode, wherein the power source is configured to apply a voltage across wastewater in the first anodic chamber and the cathodic chamber, to thereby cause multivalent cations in the wastewater to pass through the multivalent cation exchange membrane, wherein the system comprises a plurality of cells stacked between two securement plates, wherein each of the plurality of cells comprises:
    the first anode;
    the cathode;
    the first multivalent cation exchange membrane;
    a first gasket sandwiched between the first anode and the first multivalent cation exchange membrane on a first side of the first multivalent cation exchange membrane, wherein the first gasket defines a first flow path and a second flow path, wherein the first flow path defines the first anodic chamber and wherein the second flow path defines a second anodic chamber that is separate from the first anodic chamber, wherein the first anode is in contact with both the first anodic chamber and the second anodic chamber, wherein the first flow path comprises a first inlet and a first outlet, and wherein the second flow path comprises a second inlet and a second outlet; and a second gasket sandwiched between the cathode and the first multivalent cation exchange membrane on a second side of the first multivalent cation exchange membrane that is opposite the first side, wherein the second gasket defines a third flow path, wherein the third flow path defines the cathodic chamber, and wherein the third flow path comprises a third inlet and a third outlet.

19. The system of claim 18, wherein orientations of the plurality of cells alternate along a longitudinal axis between the two securement plates, such that each cell either:

shares its first anode with an adjacent cell;

shares its cathode with an adjacent cell; or shares its first anode with an adjacent cell on a first side and shares its cathode with another adjacent cell on a second side that is opposite the first side.

20. A method for electrohydromodulation of wastewater, the method comprising:

providing a continuous flow of wastewater through a reactor that comprises a first anodic chamber, a second anodic chamber, a cathodic chamber, and a multivalent cation exchange member between the first anodic chamber and the cathodic chamber and between the second anodic chamber and the cathodic chamber, wherein at least one anode is in contact with the first and second anodic chambers, wherein a cathode is in contact with the cathodic chamber, wherein the multivalent cation exchange membrane is configured to allow multivalent cations to pass therethrough while preventing monovalent ions to pass therethrough, and wherein the continuous flow comprises a path from an exterior of the first anodic chamber to the first anodic chamber to the cathodic chamber to the second anodic chamber to an exterior of the second anodic chamber;

stripping carbon dioxide from the wastewater in the first anodic chamber;

after stripping the carbon dioxide from the wastewater in the first anodic chamber, applying a voltage between the first anode and the cathode and between the second anode and the cathode to decrease pH of wastewater in the first anodic chamber and the second anodic chamber and increase pH of wastewater in the cathodic chamber, to thereby cause precipitation of phosphates in the cathodic chamber;

extracting the precipitated phosphates from the wastewater in the cathodic chamber; and extracting ammonia gas from the wastewater in the path between the cathodic chamber and the second anodic chamber.

21. The method of claim 20, further comprising periodically reversing a polarity between the first anode and the cathode and between the second anode and the cathode.

\* \* \* \* \*